(12) United States Patent
Min et al.

(10) Patent No.: US 12,452,511 B2
(45) Date of Patent: Oct. 21, 2025

(54) CAMERA ACTUATOR AND CAMERA DEVICE COMPRISING SAME

(71) Applicant: LG INNOTEK CO., LTD., Seoul (KR)

(72) Inventors: Sang Jun Min, Seoul (KR); Tae Jin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 184 days.

(21) Appl. No.: 18/288,852

(22) PCT Filed: May 6, 2022

(86) PCT No.: PCT/KR2022/006485
§ 371 (c)(1),
(2) Date: Oct. 30, 2023

(87) PCT Pub. No.: WO2022/235109
PCT Pub. Date: Nov. 10, 2022

(65) Prior Publication Data
US 2024/0210791 A1    Jun. 27, 2024

(30) Foreign Application Priority Data

May 6, 2021   (KR) .......................... 10-2021-0058522

(51) Int. Cl.
*H04N 23/54*     (2023.01)
*G03B 3/10*      (2021.01)
(Continued)

(52) U.S. Cl.
CPC .............. *H04N 23/54* (2023.01); *G03B 3/10* (2013.01); *G03B 17/17* (2013.01); *G03B 30/00* (2021.01);
(Continued)

(58) Field of Classification Search
None
See application file for complete search history.

(56) References Cited

U.S. PATENT DOCUMENTS

2020/0225442 A1*  7/2020  Weng ..................... H04N 23/54
2021/0294184 A1*  9/2021  Kim ........................ G03B 17/17
(Continued)

FOREIGN PATENT DOCUMENTS

CN        112004013         11/2020
KR    10-2018-0098463        9/2018
(Continued)

OTHER PUBLICATIONS

International Search Report dated Aug. 18, 2022 issued in Application No. PCT/KR2022/006485.

*Primary Examiner* — Paul M Berardesca
(74) *Attorney, Agent, or Firm* — KED & ASSOCIATES, LLP

(57) ABSTRACT

An embodiment of the present invention provides a camera actuator comprising: a housing; a first lens assembly and a second lens assembly which are moved in an optical axis direction on the basis of the housing; and a driving unit which moves the first lens assembly and the second lens assembly, wherein the driving unit comprises: a driving coil; and a driving magnet facing the driving coil. The driving coil comprises: a first sub-coil; a second sub-coil; and a third sub-coil arranged between the first sub-coil and the second sub-coil, wherein the first sub-coil, the third sub-coil, and the second sub-coil are sequentially arranged along the optical axis, and the length of the third sub-coil in the optical axis direction is different from the length of at least one of the first sub-coil and the second sub-coil in the optical axis direction.

20 Claims, 25 Drawing Sheets

(51) Int. Cl.
  *G03B 17/17* (2021.01)
  *G03B 30/00* (2021.01)
  *H04N 23/55* (2023.01)
  *H04N 23/57* (2023.01)
  *G02B 13/00* (2006.01)
  *G03B 5/00* (2021.01)
(52) U.S. Cl.
  CPC ............ *H04N 23/55* (2023.01); *H04N 23/57* (2023.01); *G02B 13/0065* (2013.01); *G03B 5/00* (2013.01); *G03B 2205/0046* (2013.01); *G03B 2205/0069* (2013.01)

(56) References Cited

U.S. PATENT DOCUMENTS

| | | | | |
|---|---|---|---|---|
| 2022/0082789 | A1* | 3/2022 | Hu | G03B 30/00 |
| 2023/0358995 | A1* | 11/2023 | Shin | G03B 30/00 |
| 2025/0020977 | A1* | 1/2025 | Lee | H04N 23/55 |
| 2025/0047962 | A1* | 2/2025 | Jun | G03B 3/10 |
| 2025/0085609 | A1* | 3/2025 | Oh | G03B 5/00 |

FOREIGN PATENT DOCUMENTS

| | | |
|---|---|---|
| KR | 10-2020-0043056 | 4/2020 |
| KR | 10-2021-0014875 | 2/2021 |
| WO | WO 2020/135466 | 7/2020 |

* cited by examiner

[FIG. 1]
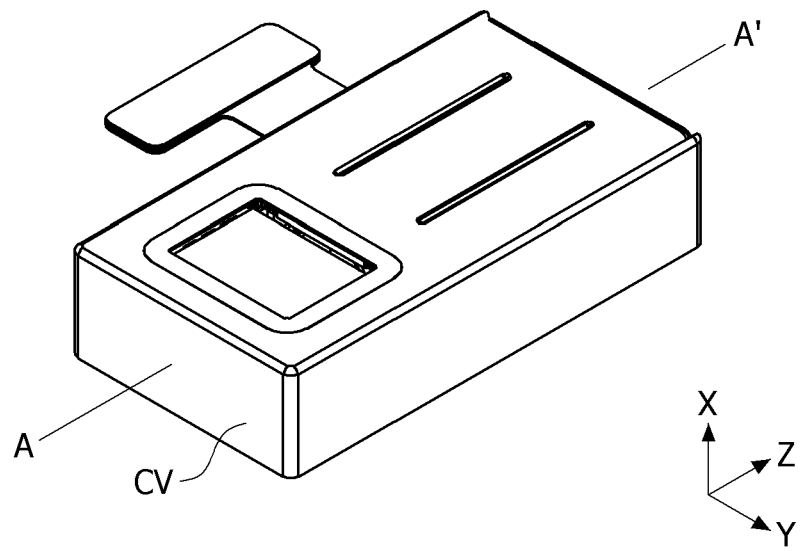

[FIG. 2]
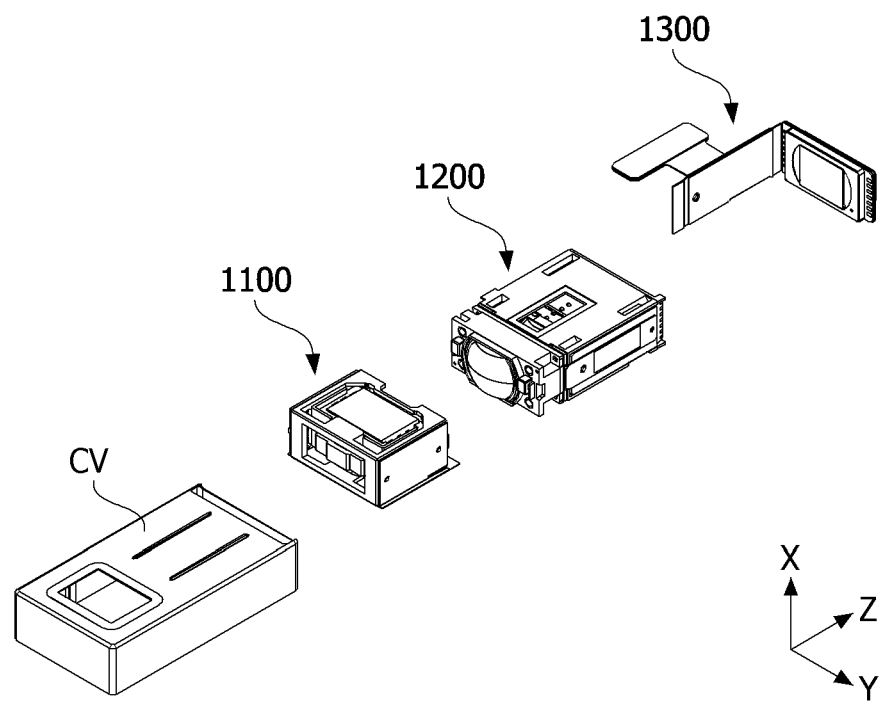

[FIG. 3]
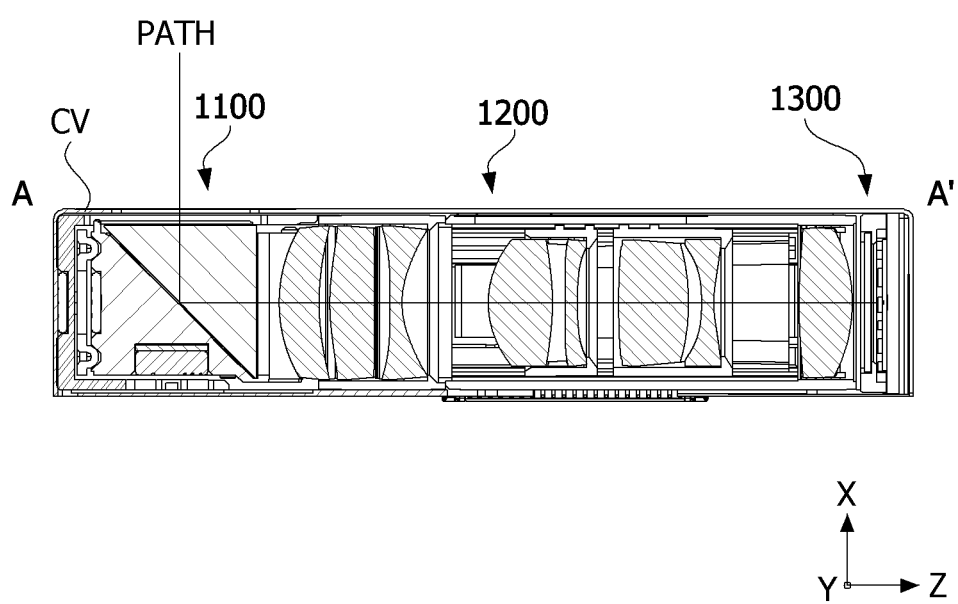

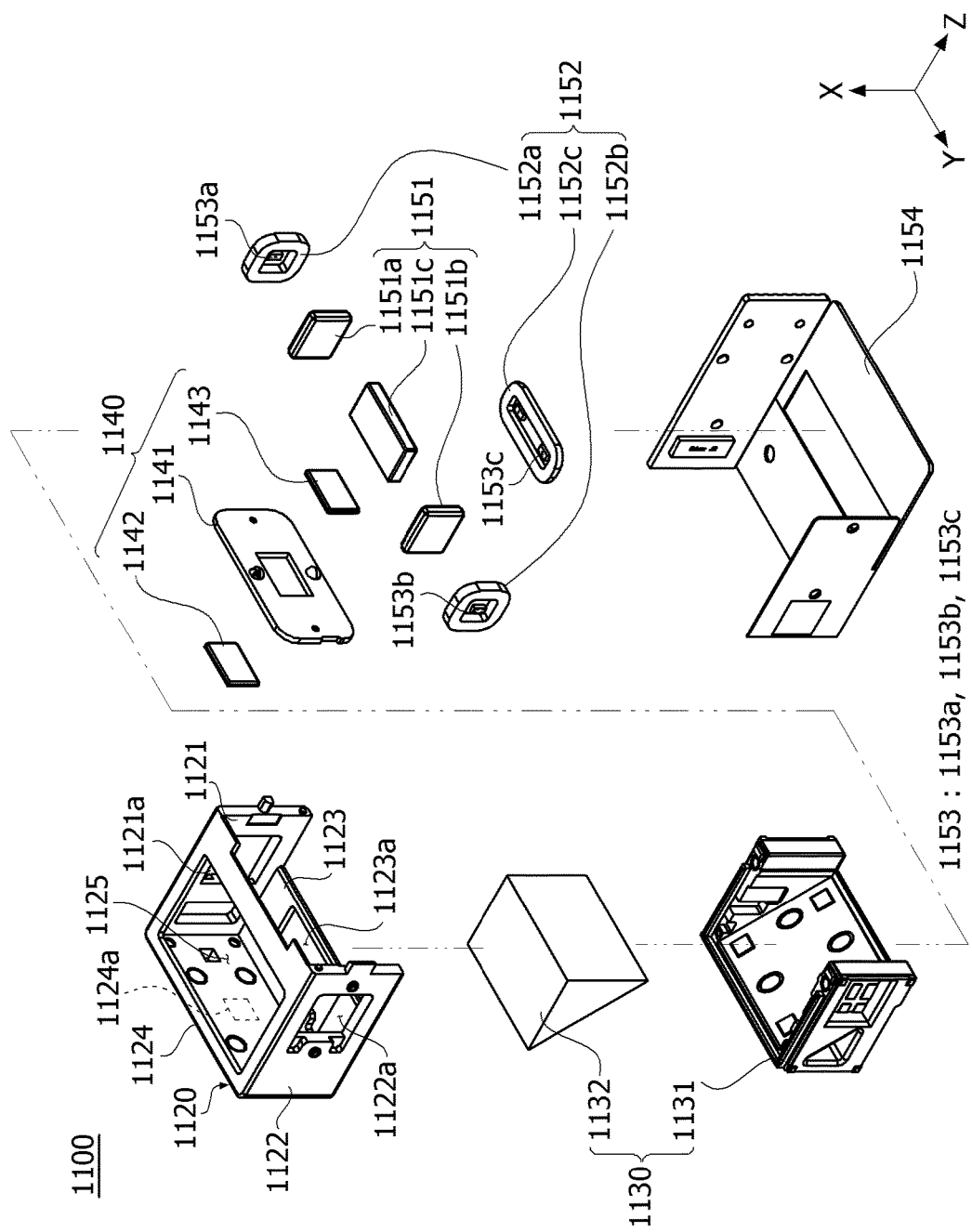

[FIG. 5]
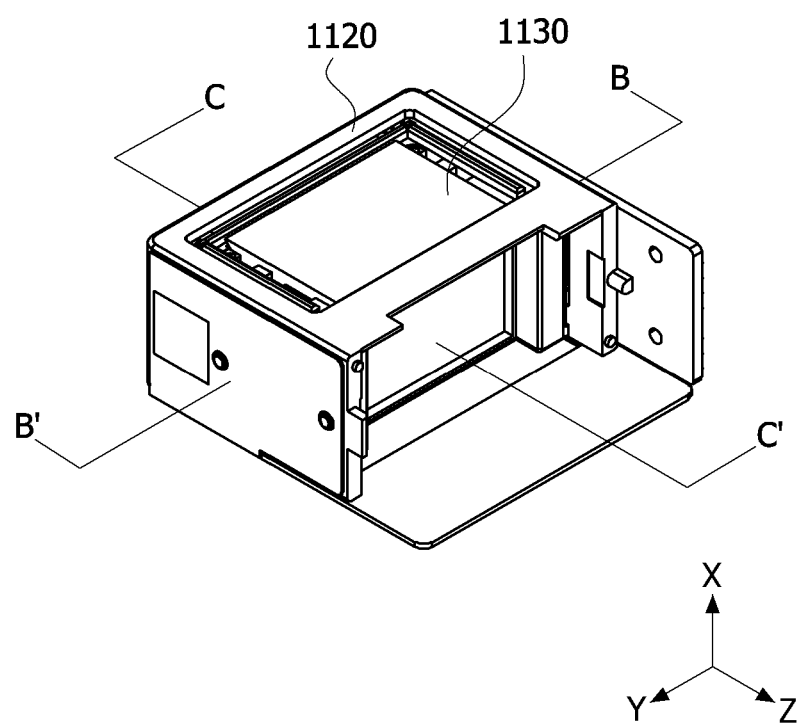

[FIG. 6]
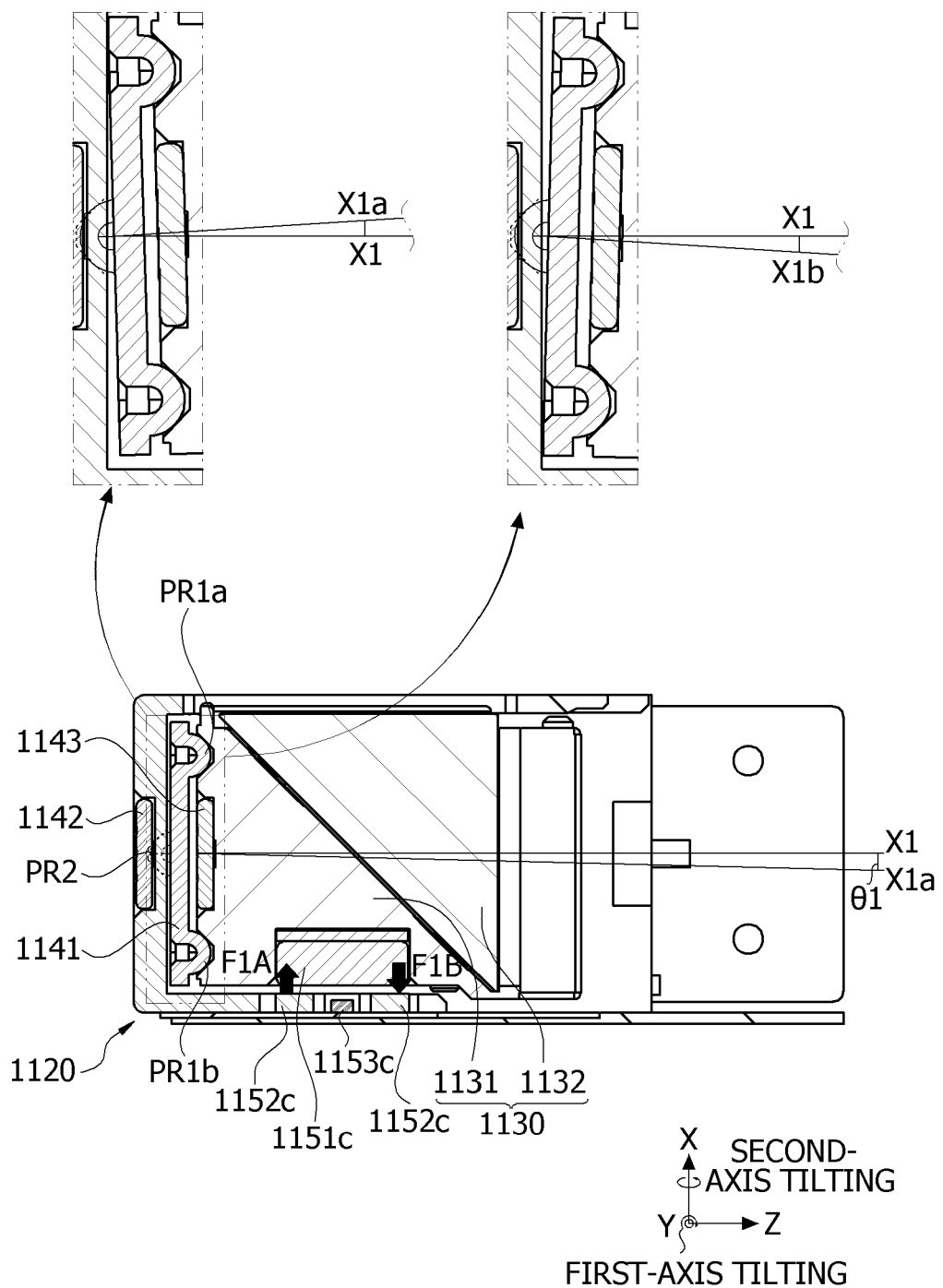

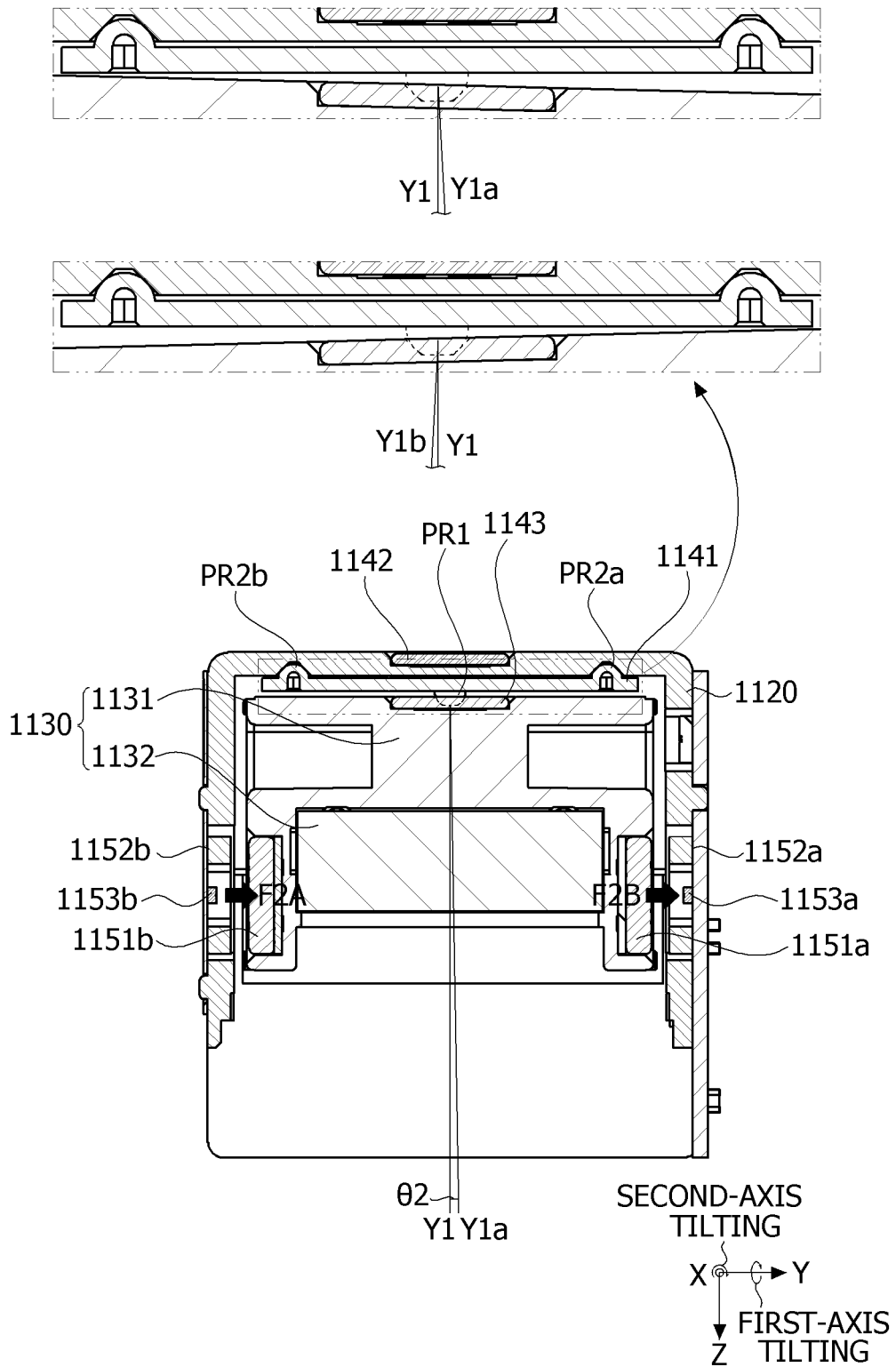
[FIG. 7]

[FIG. 8]
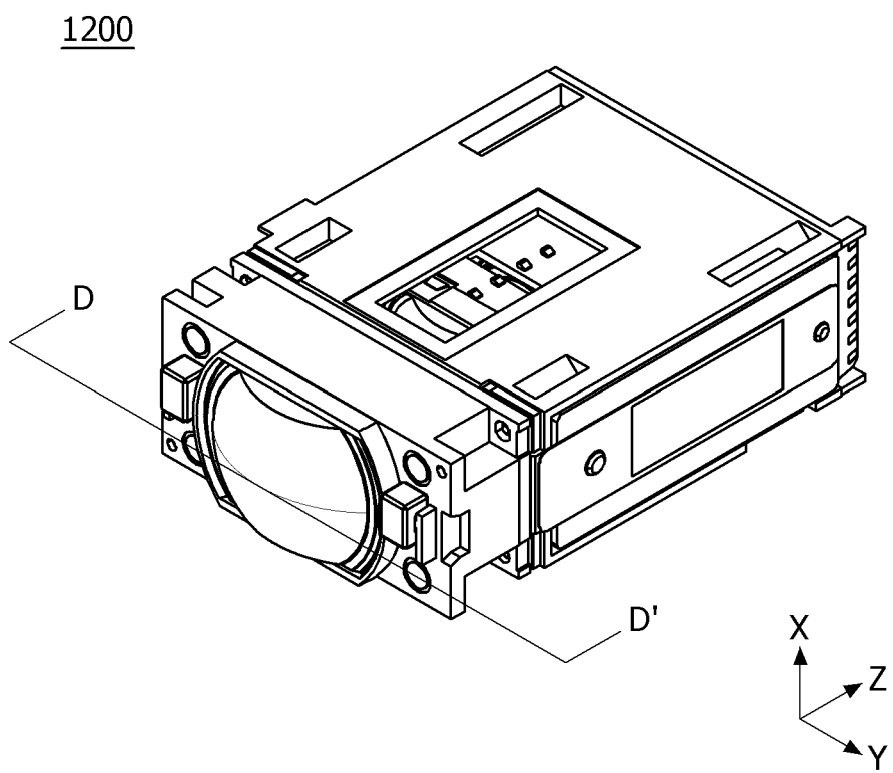

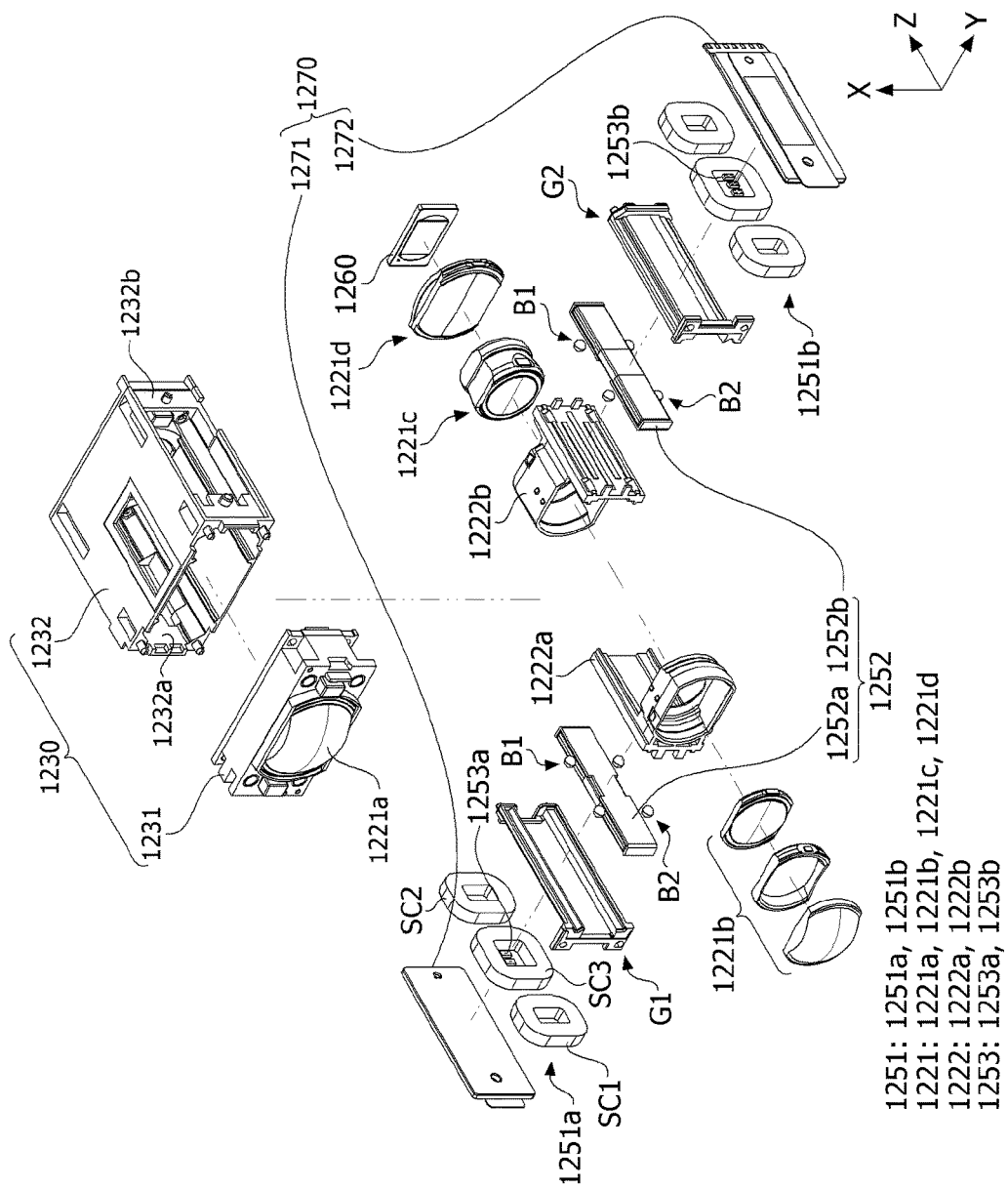

[FIG. 10]
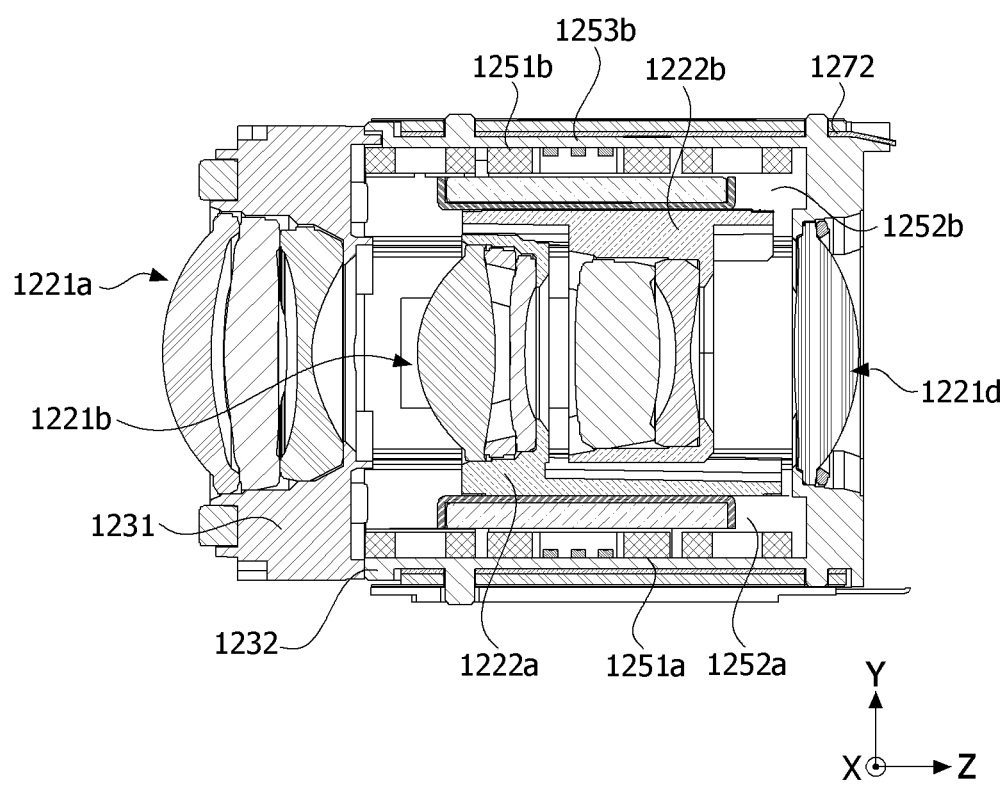

[FIG. 11]
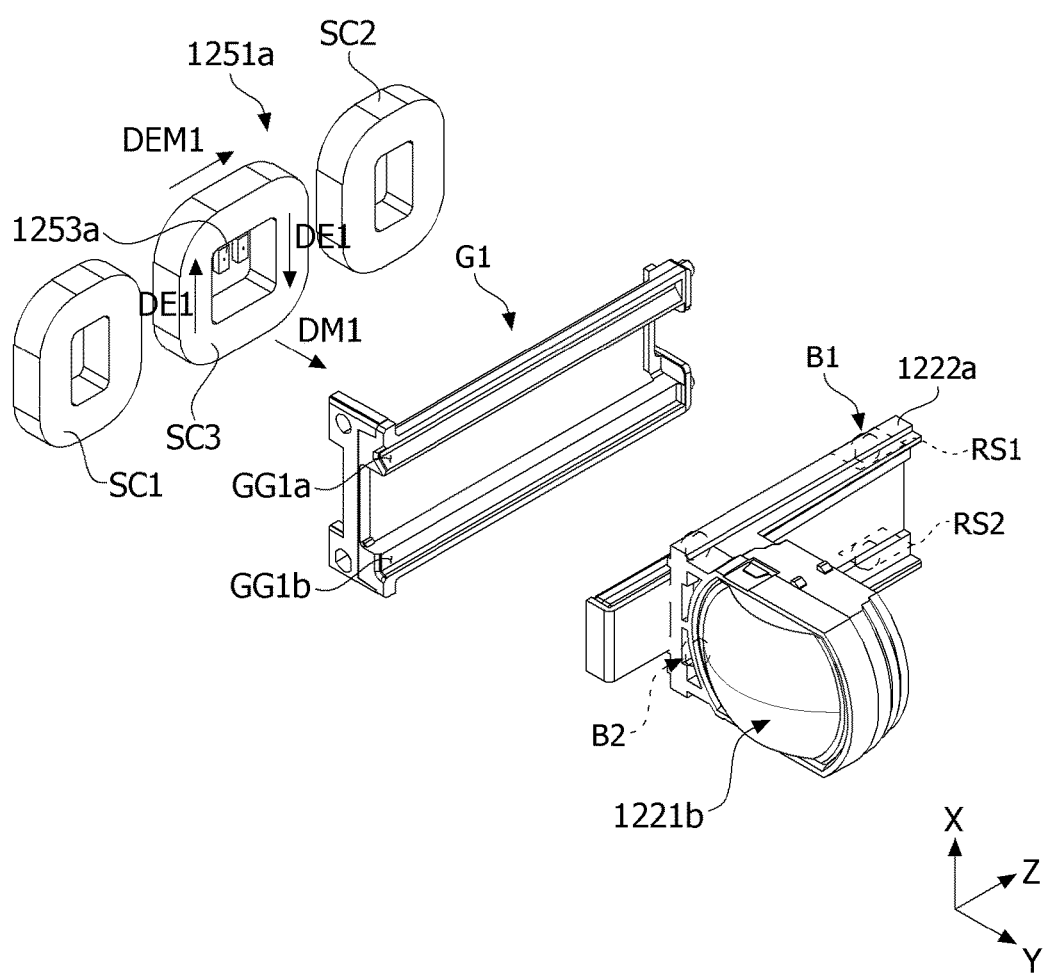

[FIG. 12]
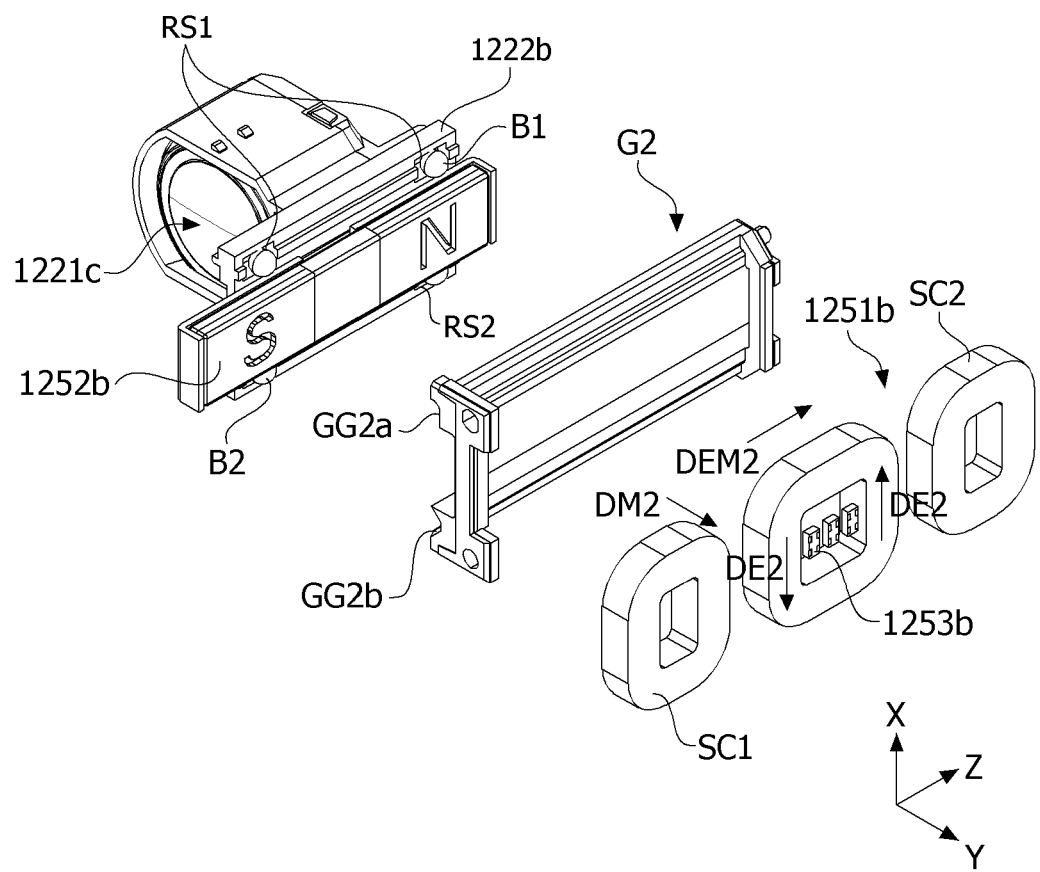

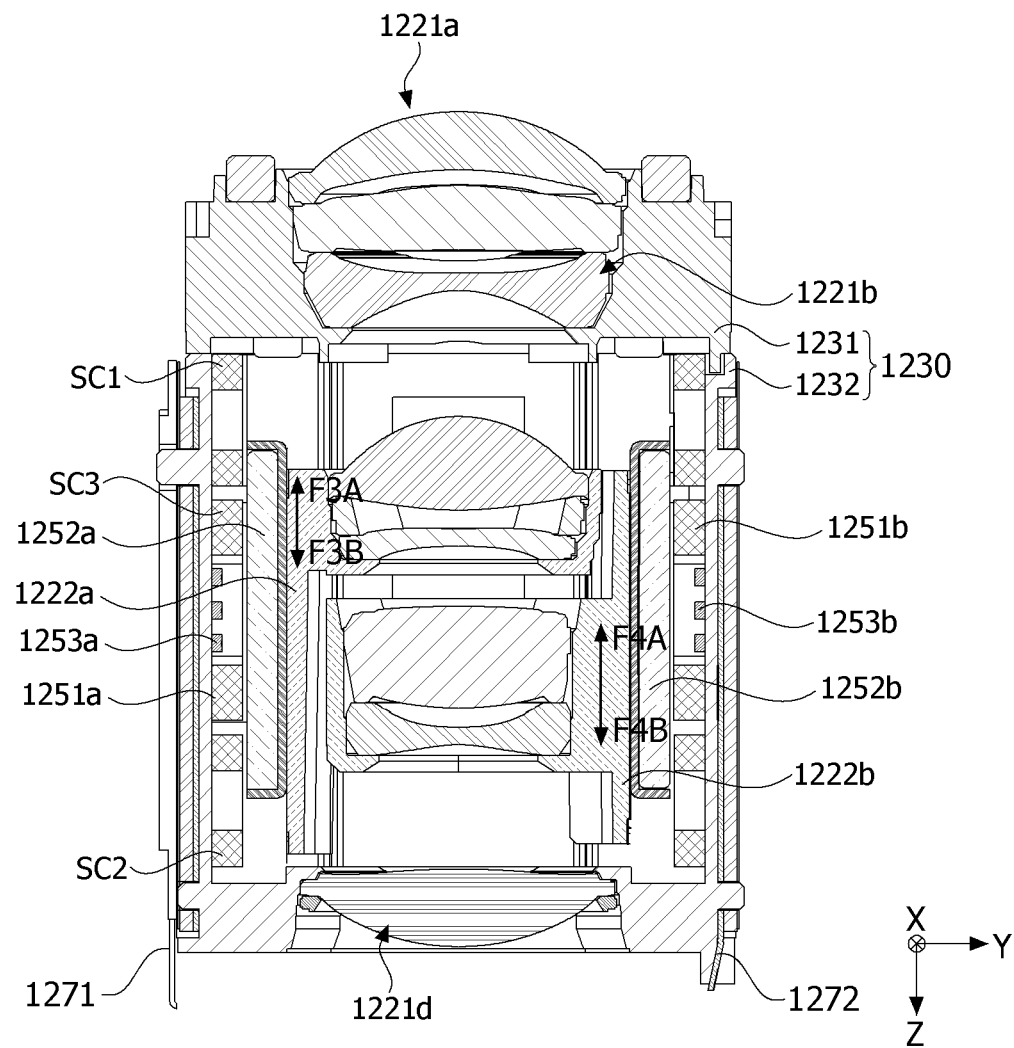

[FIG. 14]
1300
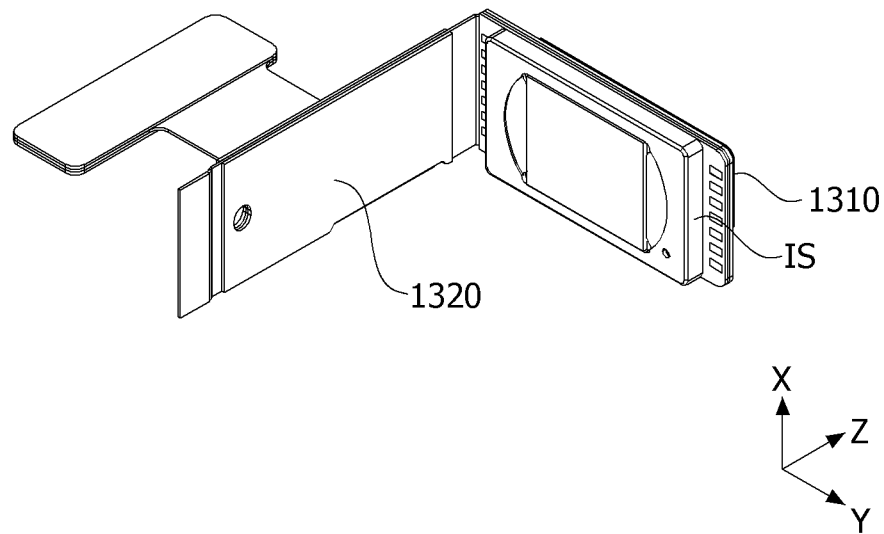

[FIG. 15]
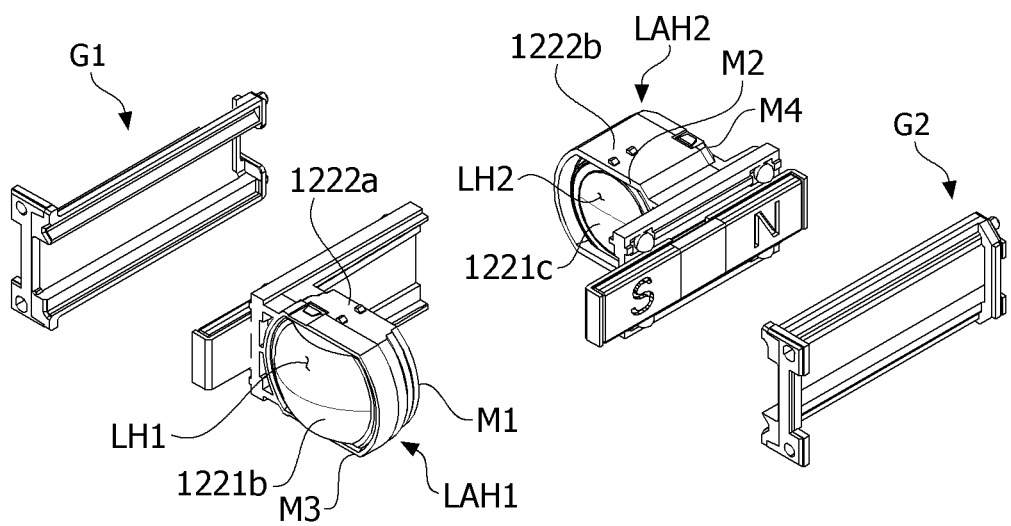
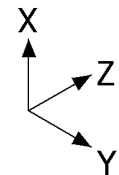

[FIG. 16]
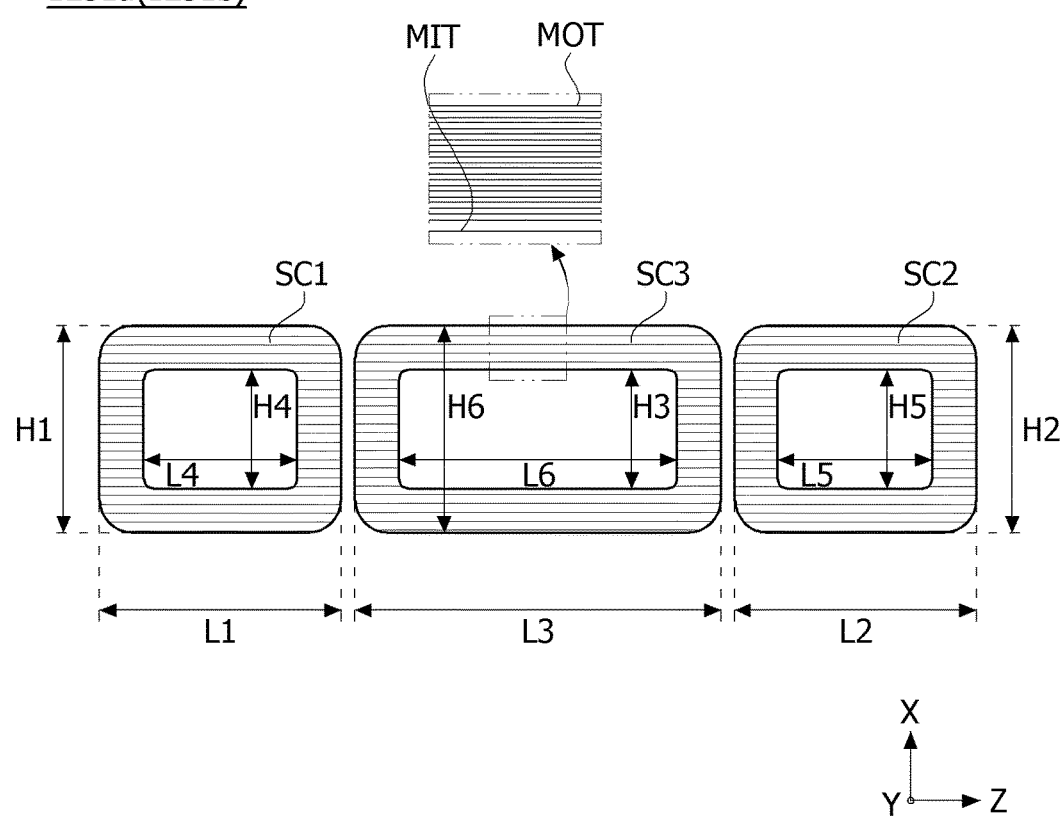

[FIG. 17]
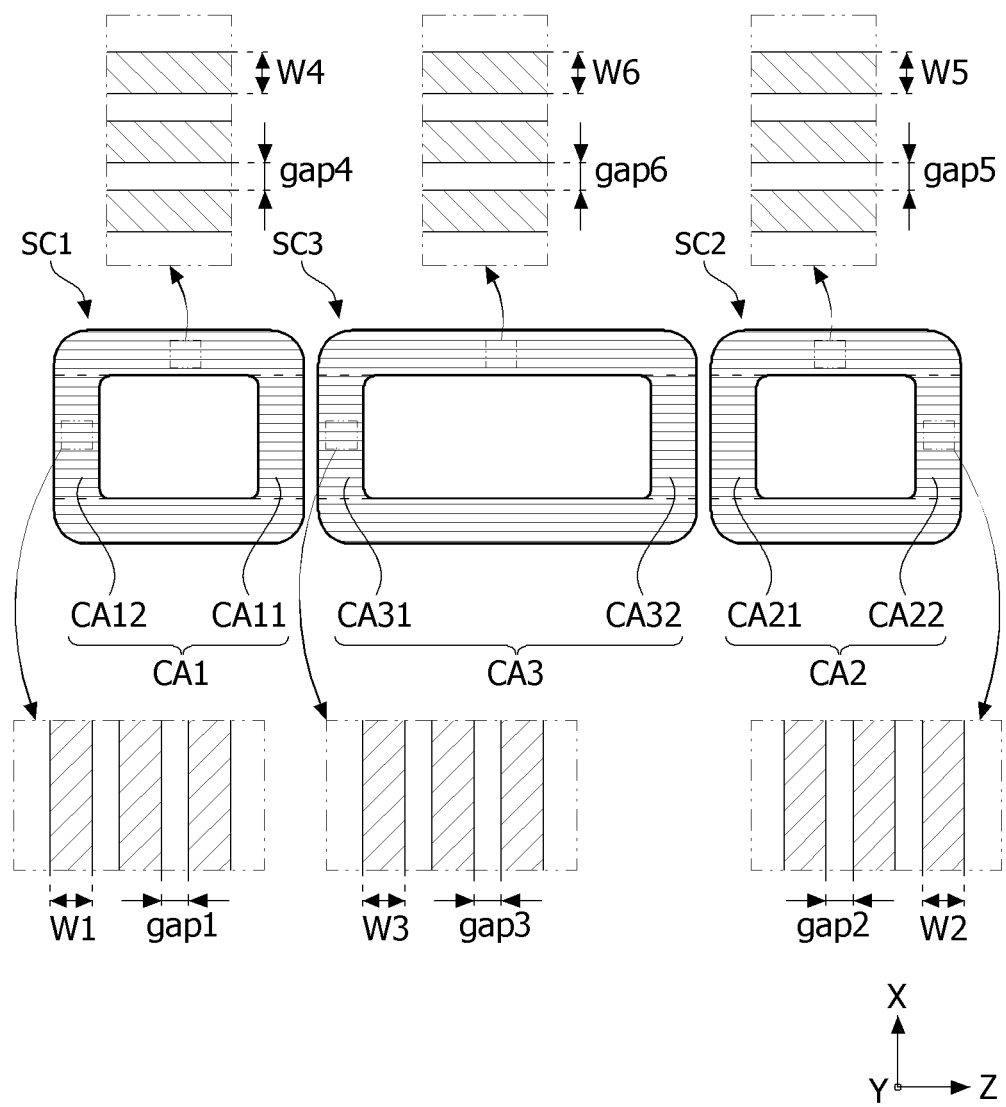

[FIG. 18]
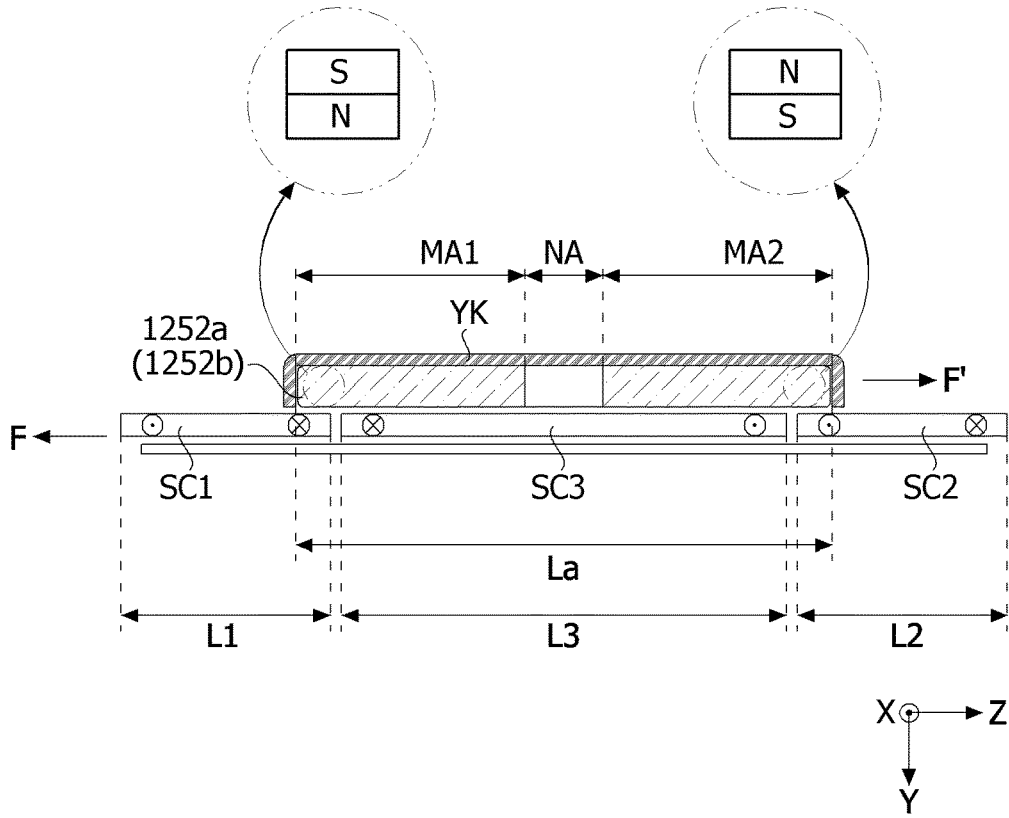
[FIG. 19]
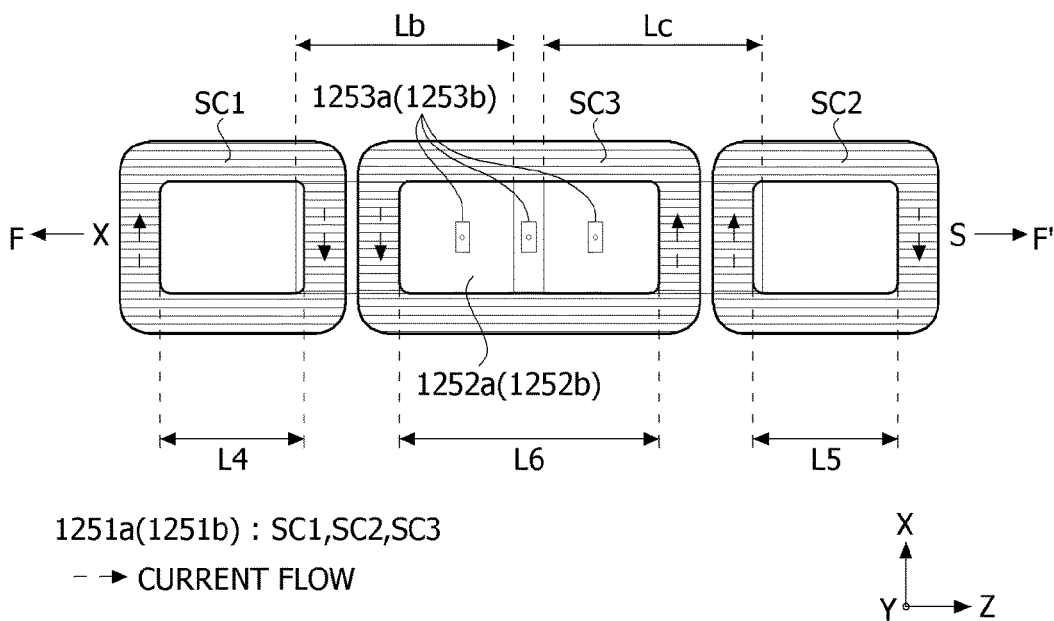

[FIG. 20]
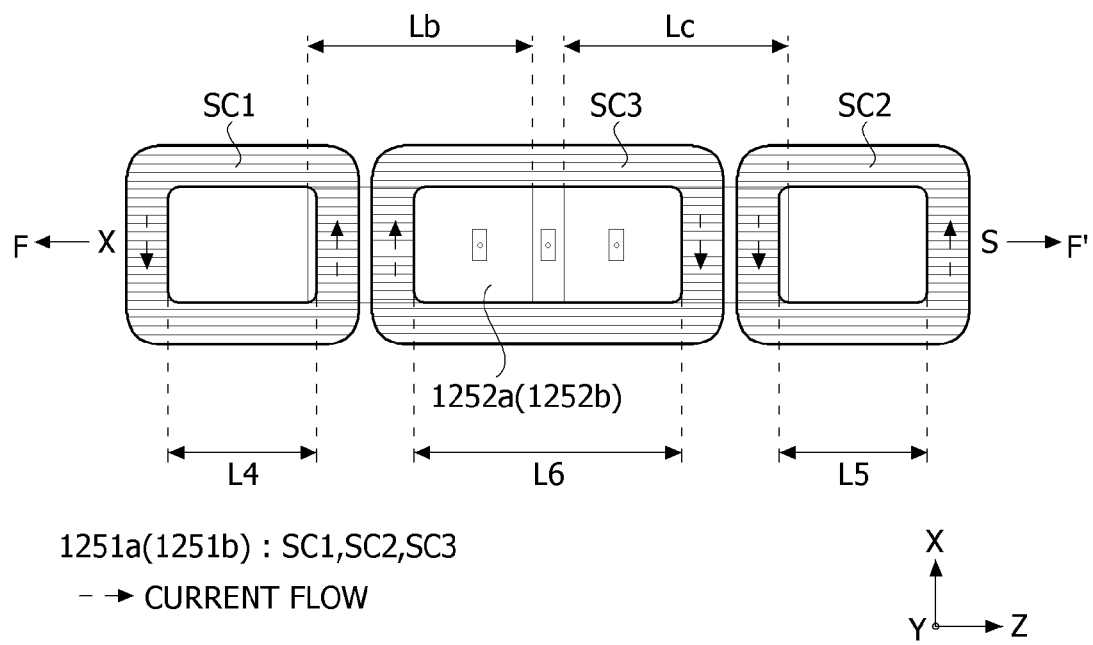
1251a(1251b) : SC1,SC2,SC3
- - → CURRENT FLOW

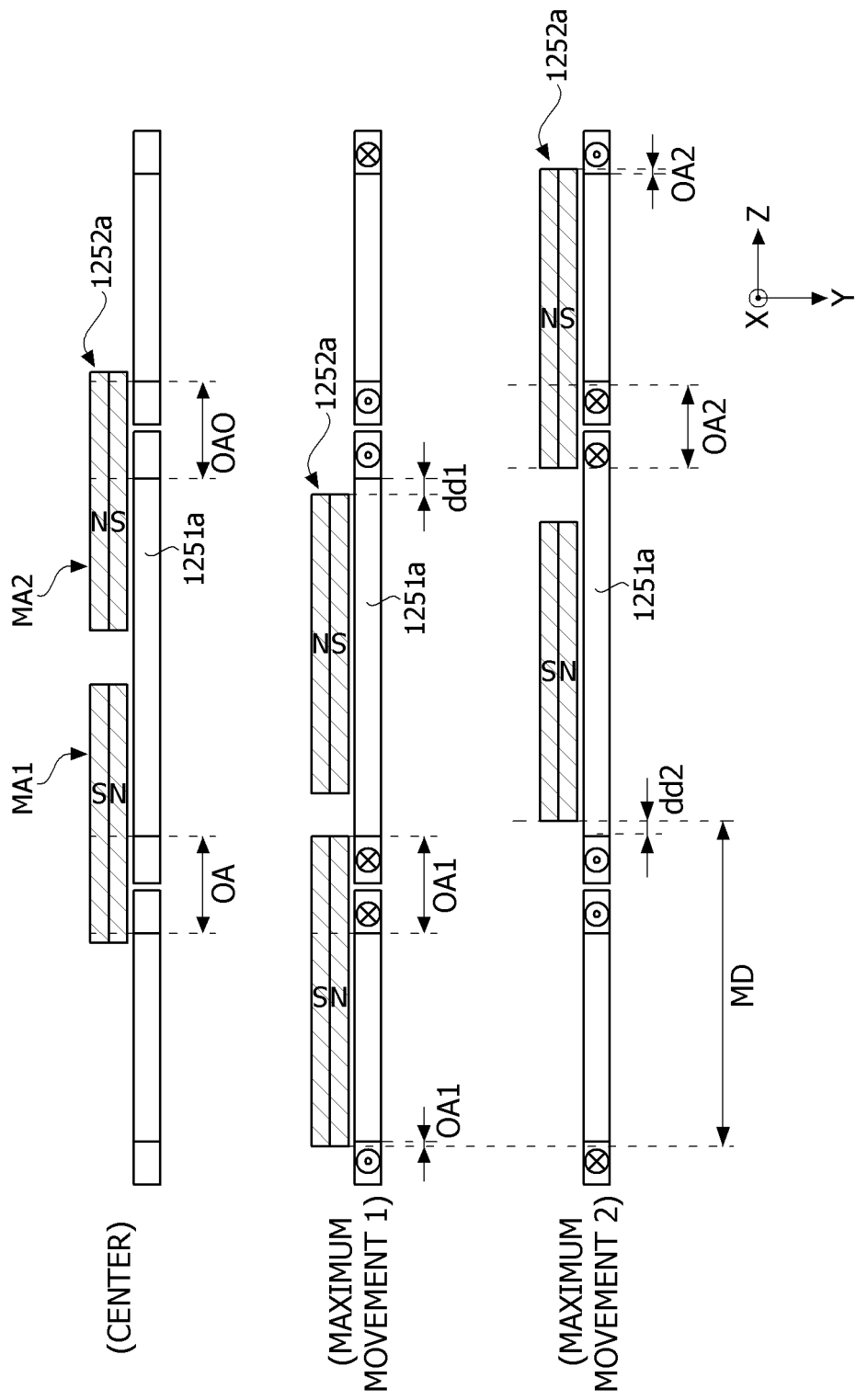

[FIG. 22]
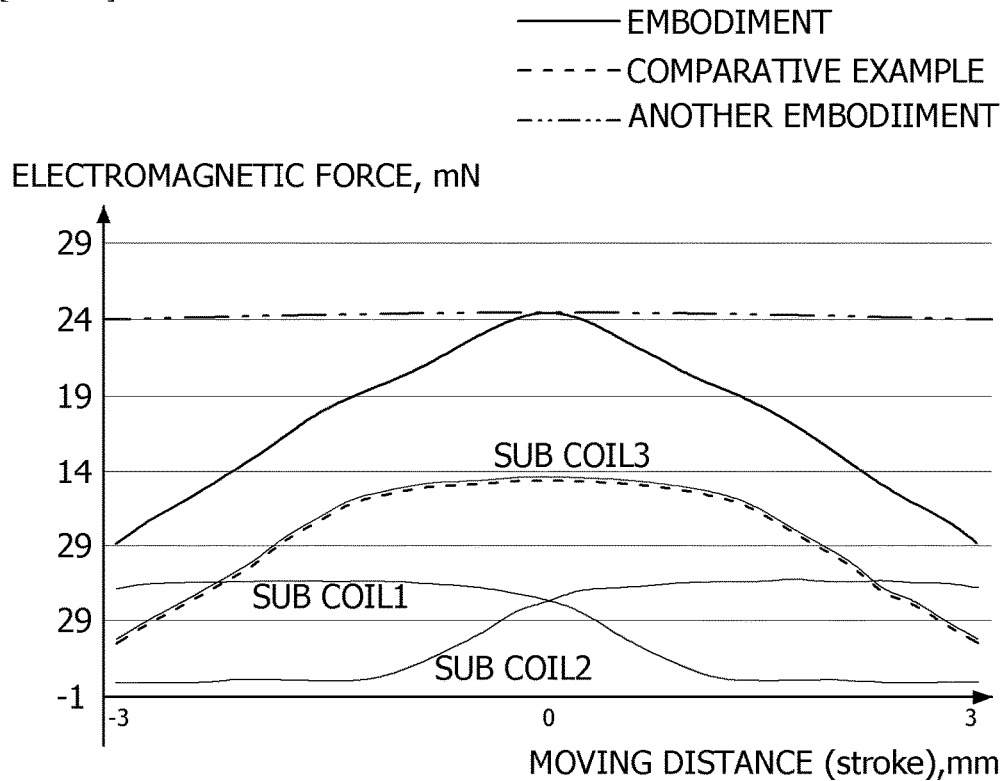
[FIG. 23]
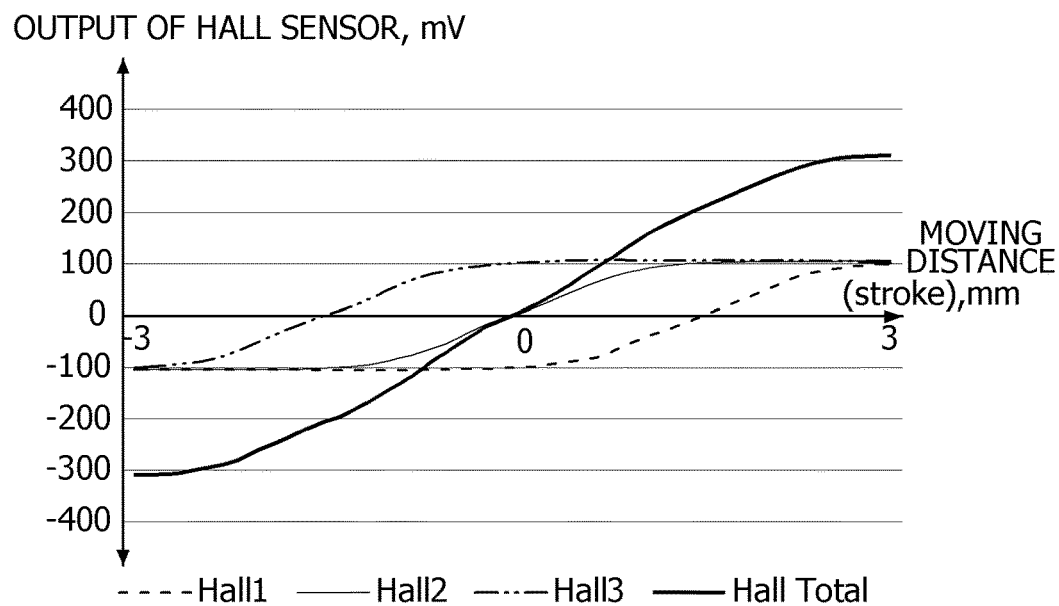

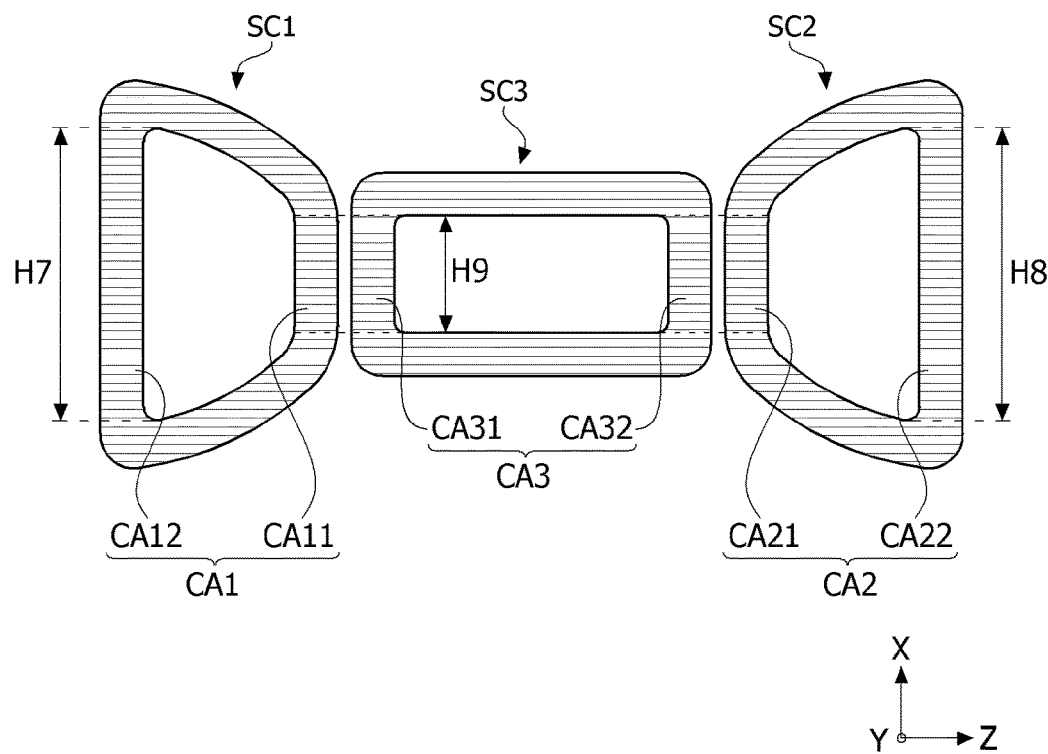
[FIG. 24]

[FIG. 25]
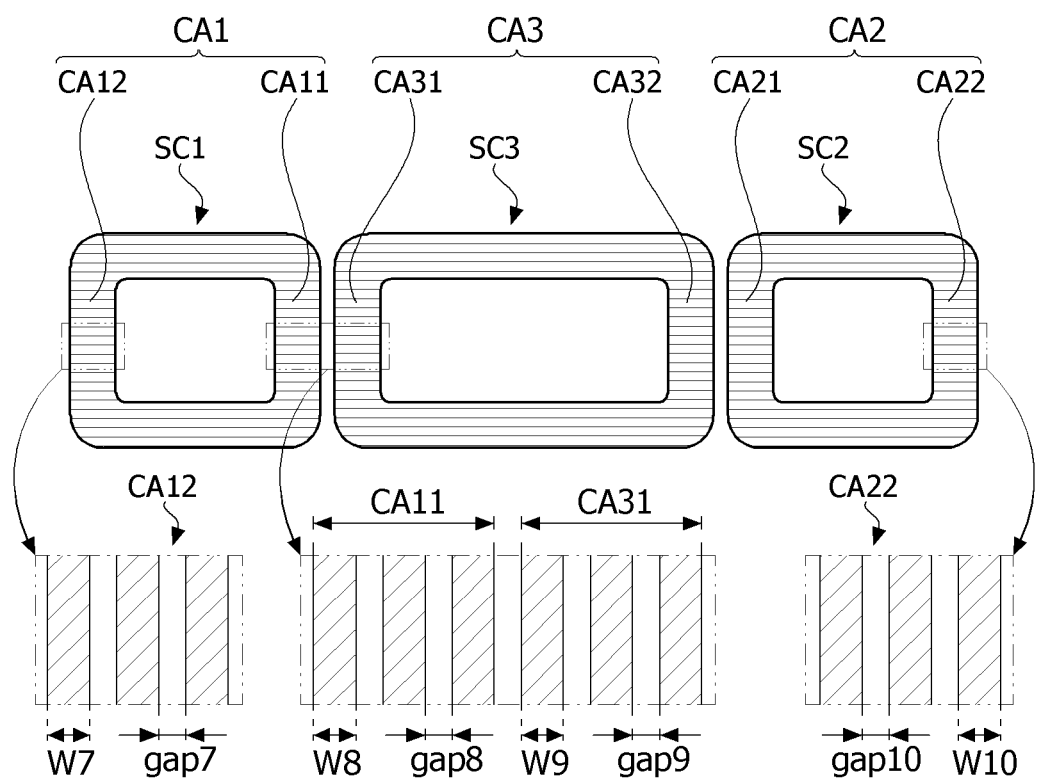

[FIG. 26]
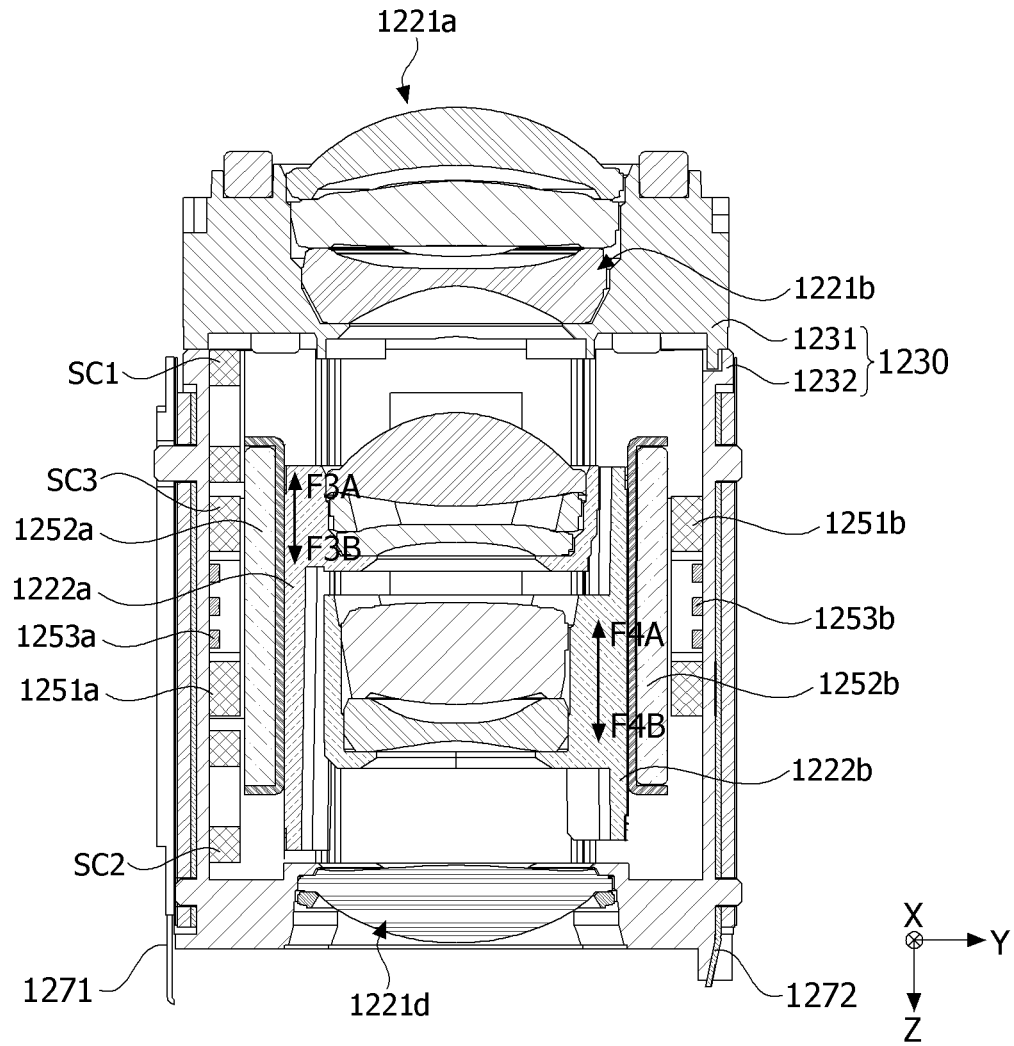
[FIG. 27]
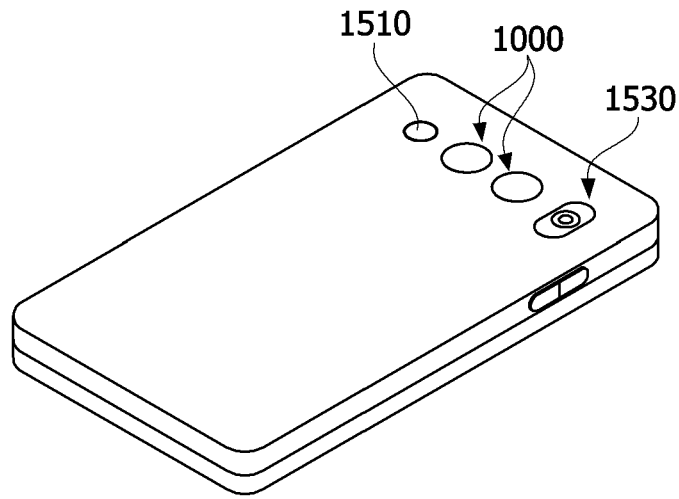

[FIG. 28]
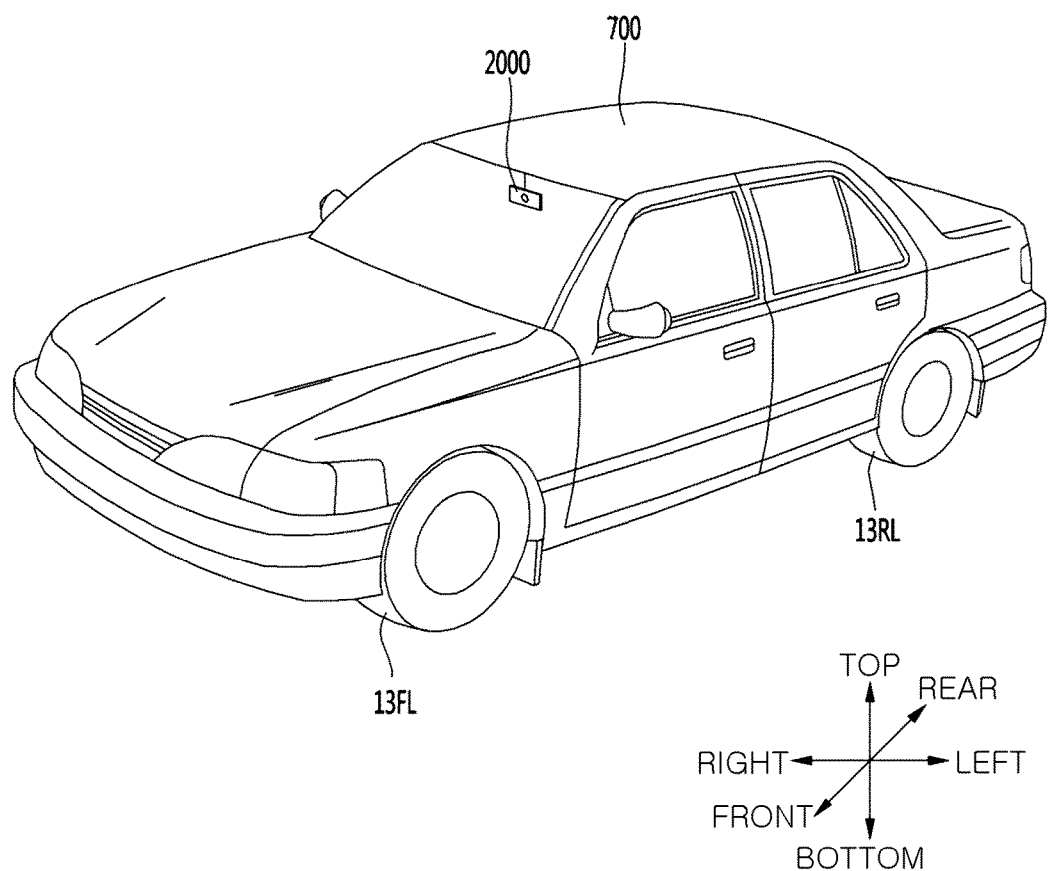

CAMERA ACTUATOR AND CAMERA DEVICE COMPRISING SAME

CROSS-REFERENCE TO RELATED PATENT APPLICATIONS

This application is a U.S. National Stage Application under 35 U.S.C. § 371 of PCT Application No. PCT/KR2022/006485, filed May 6, 2022, which claims priority to Korean Patent Application No. 10-2021-0058522, filed May 6, 2021, whose entire disclosures are hereby incorporated by reference.

TECHNICAL FIELD

The present invention relates to a camera actuator and a camera device including the same.

BACKGROUND ART

A camera is a device for making pictures or videos by photographing a subject and is mounted on a mobile device, a drone, a vehicle, etc. A camera device or a camera module may have an image stabilization (IS) function for correcting or preventing the image shake caused by a user's motion in order to improve the quality of the image, an auto focusing (AF) function for aligning a focal length of a lens by automatically adjusting a distance between an image sensor and the lens, and a zooming function for photographing a remote subject by increasing or decreasing the magnification of the remote subject through a zoom lens.

Meanwhile, a pixel density of the image sensor increases as a resolution of the camera increases, and thus a size of the pixel becomes smaller, and as the pixel becomes smaller, the amount of light received for the same time decreases. Therefore, as the camera has a higher pixel density, the image shake caused by hand shaking may more severely occur in a dark environment due to a decreased shutter speed. As a representative IS technique, there is an optical image stabilizer (OIS) technique of correcting motion by changing a path of light.

According to a common OIS technique, the motion of the camera may be detected through a gyro sensor or the like, and a lens may tilt or move, or a camera device including a lens and an image sensor may tilt or move based on the detected motion. When the lens or the camera device including the lens and the image sensor tilts or moves for an OIS, it is necessary to additionally secure a space for tilting or moving around the lens or the camera device.

Meanwhile, an actuator for an OIS may be disposed around the lens. In this case, the actuator for an OIS may include actuators, which are in charge of two axes perpendicular to an optical axis Z, that is, an actuator in charge of an X-axis tilting and an actuator in charge of a Y-axis tiling.

However, according to the needs of ultra-slim and ultra-small camera devices, there is a large space constraint for arranging the actuator for an OIS, and it may be difficult to ensure a sufficient space where a lens or a camera device including a lens and an image sensor may tilt or move for an OIS. In addition, as the camera has a higher pixel density, it is preferable that a size of the lens be increased to increase the amount of received light, and there may be a limit to increasing the size of the lens due to a space occupied by the actuator for an OIS.

In addition, when a zooming function, an AF function, and an OIS function are all included in a camera device, there is a problem that an OIS magnet and an AF or zoom magnet are disposed close to each other to cause magnetic field interference.

Technical Problem

The present invention is directed to providing a camera actuator and a camera device applicable to ultra-slim, ultra-small, and high-resolution cameras.

In addition, the present invention is directed to providing a camera actuator and a camera device, in which a moving distance of a lens assembly is improved through a shape of a driving coil.

In addition, the present invention is directed to providing a small camera actuator and camera device through the shape of the driving coil.

In addition, the present invention is directed to providing a camera actuator and a camera device, in which a moving distance for auto focusing (AF) is increased in order to implement high-magnification zoom.

In addition, the present invention is directed to providing a camera actuator and a camera device, of which a weight is decreased due to a decrease in size of a driving magnet.

The object of embodiments is not limited thereto and may also include objects or effects that may be identified from the configurations or embodiments that will be described below.

Technical Solution

A camera actuator according to an embodiment of the present invention includes a housing, a first lens assembly and a second lens assembly configured to move in an optical axis direction based on the housing, and a driving unit configured to move the first lens assembly and the second lens assembly, wherein the driving unit includes a driving coil, and a driving magnet facing the driving coil, the driving coil includes a first sub coil, a second sub coil, and a third sub coil disposed between the first sub coil and the second sub coil, the first sub coil, the third sub coil, and the second sub coil are sequentially disposed along an optical axis, and a length of the third sub coil in the optical axis direction differs from a length of at least one of the first sub coil and the second sub coil in the optical axis direction.

The length of the third sub coil in the optical axis direction may be larger than the length of the at least one of the first sub coil and the second sub coil in the optical axis direction.

The length of the first sub coil in the optical axis direction may be the same as the length of the second sub coil in the optical axis direction.

A sum of the length of the at least one of the first sub coil and the second sub coil and the length of the third sub coil in the optical axis direction may be larger than a length of the driving magnet in the optical axis direction.

The driving coil may be formed with a plurality of turns.

The first sub coil may include a first coil area having patterns extending in a vertical direction, the second sub coil may include a second coil area having a pattern extending in the vertical direction, and the third sub coil may include a third coil area having a pattern extending in the vertical direction.

The first coil area may include a first-first coil area adjacent to the third sub coil, and a first-second coil area spaced apart from the first-first coil area along the optical axis, and the second coil area may include a second-first coil area adjacent to the third sub coil, and a second-second coil area spaced apart from the second-first coil area along the optical axis.

A length of the first-second coil area in the vertical direction may be larger than a length of the first-first coil area in the vertical direction.

A length of the second-second coil area in the vertical direction may be larger than a length of the second-first coil area in the vertical direction.

A length of each turn in the optical axis direction in the first-second coil area may differ from a length of each turn in the optical axis direction in the first-first coil area.

A length of the first-second coil area in the optical axis direction may differ from a length of the first-first coil area in the optical axis direction.

The third coil area may include a third-first coil area adjacent to the first sub coil, and a third-second coil area spaced apart from the second-first coil area along the optical axis.

A length between an innermost turn among a plurality of turns in the third-first coil area and an innermost turn among a plurality of turns in the third-second coil area in the optical axis direction may be larger than the length of the first sub coil or the second sub coil in the optical axis direction.

A surface of the driving magnet facing the driving coil may include a first magnet area having a first polarity, and a second magnet area having a second polarity, and the first polarity may be opposite to the second polarity.

The first magnet area may overlap the first sub coil and the third sub coil, and the second magnet area may overlap the second sub coil and the third sub coil.

Among the driving coils, the number of coils for driving the first lens assembly and the number of coils for driving the second lens assembly may differ from each other.

Advantageous Effects

Embodiments of the present invention, it is possible to implement a camera actuator having a driving unit for providing a long stroke (long moving distance) for auto focusing (AF)/zooming.

According to the present invention, it is possible to implement a camera actuator and a camera device applicable to ultra-slim, ultra-small, and high-resolution cameras.

According to the present invention, it is possible to implement a camera actuator and a camera device, in which a moving distance of a lens assembly is improved through a shape of a driving coil.

In addition, it is possible to implement a camera actuator and a camera device, in which a moving distance for AF is increased in order to implement high-magnification zoom.

According to the present invention, it is possible to implement a small camera actuator and camera device through the shape of the driving coil.

According to the present invention, it is possible to implement a camera actuator and a camera device, of which a weight is decreased due to a decrease in size of a driving magnet.

Various and beneficial advantages and effects of the present invention are not limited to the above-described contents and will be more readily understood in a process of describing specific embodiments of the present invention.

DESCRIPTION OF DRAWINGS

FIG. 1 is a perspective view of a camera device according to an embodiment.

FIG. 2 is an exploded perspective view of the camera device according to the embodiment.

FIG. 3 is a cross-sectional view of the camera device along line A-A' in FIG. 1.

FIG. 4 is an exploded perspective view of a first camera actuator according to the embodiment.

FIG. 5 is a perspective view of the first camera actuator according to the embodiment from which a first shield can and a board are removed.

FIG. 6 is a cross-sectional view of the first camera actuator along line B-B' in FIG. 5.

FIG. 7 is a cross-sectional view of the first camera actuator along line C-C' in FIG. 5.

FIG. 8 is a perspective view of a second camera actuator according to the embodiment.

FIG. 9 is an exploded perspective view of the second camera actuator according to the embodiment.

FIG. 10 is a cross-sectional view of the second camera actuator along line D-D' in FIG. 8.

FIGS. 11 and 12 are views for describing each driving operation of a lens assembly according to the embodiment.

FIG. 13 is a view for describing the driving of the second camera actuator according to the embodiment.

FIG. 14 is a schematic diagram illustrating a circuit board according to the embodiment.

FIG. 15 is a perspective view of a first lens assembly, a first bonding member, a second bonding member, and a second lens assembly according to the embodiment.

FIG. 16 is a view illustrating a second driving coil according to the embodiment.

FIG. 17 is an enlarged view of some of a plurality of turns in the second driving coil according to the embodiment.

FIG. 18 is a top view of a second driving unit and a first board according to the embodiment.

FIGS. 19 and 20 are side views of the second driving unit according to the embodiment.

FIG. 21 is a view for describing the movement of a second driving magnet by the second driving unit according to the embodiment.

FIG. 22 is a graph showing an electromagnetic force according to a position of the second driving magnet.

FIG. 23 is a graph showing an output of a Hall sensor according to a moving distance.

FIG. 24 is a view illustrating a second driving coil according to another embodiment.

FIG. 25 is a view illustrating a second driving coil according to still another embodiment.

FIG. 26 is a cross-sectional view of a second camera actuator according to a modified example.

FIG. 27 is a perspective view of a mobile terminal to which the camera device according to the embodiment is applied.

FIG. 28 is a perspective view of a vehicle to which the camera device according to the embodiment is applied.

MODES OF THE INVENTION

Since the present invention may have various changes and various embodiments, specific embodiments are illustrated and described in the accompanying drawings.

However, it should be understood that this is not intended to limit specific embodiments and includes all modifications and substitutes included in the spirit and technical scope of the present invention.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

When a first component is described as being "connected" or "coupled" to a second component, it should be understood that the first component may be directly connected or coupled to the second component or a third component may be present therebetween. On the other hand, when the first component is described as being "directly connected" or "directly coupled" to the second component, it should be understood that the third component is not present therebetween.

The terms used in the application are only used to describe specific embodiments and are not intended to limit the present invention. The singular expression includes the plural expression unless the context clearly dictates otherwise. In the application, it should be understood that terms such as "comprise" or "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present invention pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are denoted by the same reference numeral regardless of the reference numerals, and overlapping descriptions thereof will be omitted.

FIG. 1 is a perspective view of a camera device according to an embodiment, FIG. 2 is an exploded perspective view of the camera device according to the embodiment, and FIG. 3 is a cross-sectional view of the camera device along line A-A' in FIG. 1.

Referring to FIGS. 1 and 2, a camera device 1000 according to the embodiment may include a cover CV, a first camera actuator 1100, a second camera actuator 1200, and a circuit board 1300. Here, the first camera actuator 1100 may be used interchangeably with "a first actuator," and the second camera actuator 1200 may be used interchangeably with "a second actuator."

The cover CV may cover the first camera actuator 1100 and/or the second camera actuator 1200. It is possible to increase a coupling strength between the first camera actuator 1100 and the second camera actuator 1200 by the cover CV.

Furthermore, the cover CV may be made of a material that blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator.

In the embodiment, the first camera actuator 1100 may change an optical path. In the embodiment, the first camera actuator 1100 may perpendicularly change the optical path through an internal optical member (e.g., a prism or mirror). With this configuration, even when a thickness of a mobile terminal decreases, a configuration of a lens that is larger than the thickness of the mobile terminal is disposed in the mobile terminal so that magnification, auto focusing (AF), and OIS functions may be performed through the change in the optical path.

The first camera actuator 1100 may change the optical path from a first direction to a third direction. In the specification, an optical axis direction is the third direction or a Z-axis direction and corresponds to a traveling direction of light provided to an image sensor.

Additionally, the first camera actuator 1100 may include a lens disposed in a lens disposed in a predetermined barrel (not illustrated). In addition, the lens may include a fixed focal length lens. The fixed focal length lens may be referred to as "a single focal length lens" or "a single lens."

The second camera actuator 1200 may be disposed behind the first camera actuator 1100. The second camera actuator 1200 may be coupled to the first camera actuator 1100. In addition, mutual coupling may be performed in various manners.

In addition, the second camera actuator 1200 may be a zoom actuator or AF actuator. For example, the second camera actuator 1200 may support one or more lenses and perform an AF function or zooming function by moving the lenses according to a predetermined control signal of a control unit.

The circuit board 1300 may be disposed behind the second camera actuator 1200. The circuit board 1300 may be electrically connected to the second camera actuator 1200 and the first camera actuator 1100. In addition, a plurality of circuit boards 1300 may be provided.

The circuit board 1300 may be connected to a second housing of the second camera actuator 1200 and may be provided with an image sensor. Furthermore, a base unit including a filter may be seated on the circuit board 1300. A description thereof will be made below.

The camera device according to the embodiment may be formed of one camera device or a plurality of camera devices. For example, the plurality of camera devices may include a first camera device and a second camera device. In addition, as described above, the camera device may be used interchangeably with "a camera module," "a camera device," "an imaging device," "an imaging module," "an imaging machine," etc.

In addition, the first camera device may include one actuator or a plurality of actuators. For example, the first camera device may include the first camera actuator 1100 and the second camera actuator 1200.

In addition, the second camera device may include an actuator (not illustrated) disposed in a predetermined housing (not illustrated) and capable of driving a lens unit. The actuator may be a voice coil motor, a micro actuator, a silicon actuator, or the like and applied in various methods such as an electrostatic method, a thermal method, a bimorph method, and an electrostatic force method, but the present invention is not limited thereto. In addition, in the specification, the camera actuator may be referred to as "an actuator" or the like. In addition, the camera device formed of the plurality of camera devices may be mounted in various electronic devices such as a mobile terminal.

Referring to FIG. 3, the camera device according to the embodiment may include the first camera actuator 1100 for performing the OIS function and the second camera actuator 1200 for performing the zooming function and the AF function.

Light may enter the camera device through an opening area positioned in an upper surface of the first camera actuator 1100. In other words, the light may enter the first camera actuator 1100 in an optical axis direction (e.g., an X-axis direction), and the optical path may be changed in a perpendicular direction (e.g., a Z-axis direction) through the optical member. In addition, the light may pass through the second camera actuator 1200 and may enter an image sensor IS positioned at one end of the second camera actuator 1200 (PATH).

In the specification, a lower surface is one side in the first direction. In addition, the first direction is the X-axis direction in the drawings and may be used interchangeably with a second axis direction or the like. A second direction is a Y-axis direction in the drawings and may be used interchangeably with a first axis direction or the like. The second direction is a direction perpendicular to the first direction. In addition, a third direction is the Z-axis direction in the drawings and may be used interchangeably with a third axis direction or the like. The third direction is perpendicular to both the first direction and the second direction. Here, the third direction (Z-axis direction) corresponds to the optical axis direction, and the first direction (X-axis direction) and the second direction (Y-axis direction) are directions perpendicular to an optical axis and may be tilted by the second camera actuator. A detailed description thereof will be made below. In addition, hereinafter, the optical axis direction corresponds to the optical path and is the third direction (Z-axis direction) in the description of the second camera actuator 1200, and the second camera actuator 1200 will be described below based on this.

In addition, with this configuration, the camera device according to the embodiment may reduce the spatial limitations of the first camera actuator and the second camera actuator by changing the optical path. In other words, the camera device according to the embodiment may extend the optical path while minimizing the thickness of the camera device in response to the change in the optical path. Furthermore, it should be understood that the second camera actuator may provide a high range of magnification by controlling a focus or the like in the extended optical path.

In addition, the camera device according to the embodiment may implement an OIS by controlling the optical path through the first camera actuator, thereby minimizing the occurrence of a decentering or tilting phenomenon and providing the best optical characteristics.

Furthermore, the second camera actuator 1200 may include an optical system and a lens driving unit. For example, at least one of a first lens assembly, a second lens assembly, a third lens assembly, and a guide pin may be disposed in the second camera actuator 1200.

In addition, the second camera actuator 1200 may include a coil and a magnet and perform a high-magnification zooming function.

For example, the first lens assembly and the second lens assembly may be moving lenses that move through the coil, the magnet, and the guide pin, and the third lens assembly may be a fixed lens, but the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or a distance to an image is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below.

Meanwhile, when the OIS actuator and the AF/zoom actuator are disposed according to the embodiment of the present invention, it is possible to prevent the magnetic field interference with an AF or zoom magnet when an OIS is driven. Since a first driving magnet of the first camera actuator 1100 is disposed separately from the second camera actuator 1200, it is possible to prevent the magnetic field interference between the first camera actuator 1100 and the second camera actuator 1200. In the specification, an OIS may be used interchangeably with terms such as hand shaking correction, optical image stabilization, optical image correction, shake correction, etc.

FIG. 4 is an exploded perspective view of a first camera actuator according to the embodiment.

Referring to FIG. 4, the first camera actuator 1100 according to the embodiment includes a first shield can (not illustrated), a first housing 1120, a mover 1130, a rotating unit 1140, and a first driving unit 1150.

The mover 1130 may include a holder 1131 and an optical member 1132 seated on the holder 1131. In addition, the rotating unit 1140 includes a rotating plate 1141, a first magnetic part 1142 having a coupling strength with the rotating plate 1141, and a second magnetic part 1143 positioned within the rotating plate 1141. In addition, the first driving unit 1150 includes a first driving magnet 1151, a first driving coil 1152, a first Hall sensor unit 1153, and a first board unit 1154.

The first shield can (not illustrated) may be positioned at an outermost side of the first camera actuator 1100 to surround the rotating unit 1140 and the first driving unit 1150, which will be described below.

The first shield can (not illustrated) can block or attenuate electromagnetic waves generated from the outside. Therefore, it is possible to reduce the occurrence of malfunction in the first driving unit 1150.

The first housing 1120 may be positioned inside the first shield can (not illustrated). In addition, the first housing 1120 may be positioned inside the first board unit 1154 to be described below. The first housing 1120 may be coupled to the first shield can (not illustrated) by being fitted into or matched with the first shield can.

The first housing 1120 may be formed of a plurality of housing side portions. The first housing 1120 may include a first housing side portion 1121, a second housing side portion 1122, a third housing side portion 1123, and a fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may be a lower side portion of the first housing 1120 and may include a lower surface.

In addition, the first housing side portion 1121 may include a first housing hole 1121a. A first coil 1152a to be described below may be positioned in the first housing hole 1121a.

In addition, the second housing side portion 1122 may include a second housing hole 1122a. In addition, a second coil 1152b to be described below may be positioned in the second housing hole 1122a.

The first coil 1152a and the second coil 1152b may be coupled to the first board unit 1154. In the embodiment, the first coil 1152a and the second coil 1152b may be electrically connected to the first board unit 1154 so that a current flows therebetween. The current is an element of an electromagnetic force capable of tilting the first camera actuator with respect to an X-axis.

In addition, the third housing side portion 1123 may include a third housing hole 1123a. A first coil 1152c to be described below may be positioned in the third housing hole 1123a. The third coil 1152c may be coupled to the first board unit 1154. In addition, the third coil 1152c may be electrically connected to the first board unit 1154 so that a current flows therebetween. The current is an element of an electromagnetic force capable of tilting the first camera actuator with respect to a Y-axis.

The fourth housing side portion 1124 may include a first housing groove 1124a. The first magnetic part 1142 to be described below may be disposed in an area facing a first housing groove 1124a. Therefore, the first housing 1120 may be coupled to the rotating plate 1141 by a magnetic force or the like.

In addition, the first housing groove 1124a according to the embodiment may be positioned on an inner surface or an outer surface of the fourth housing side portion 1124. Therefore, the first magnetic part 1142 may also be disposed to correspond to a position of the first housing groove 1124a.

In addition, the first housing 1120 may include an accommodating part 1125 formed by the first to fourth housing side portions 1121 to 1124. The mover 1130 may be positioned in the accommodating part 1125.

The mover 1130 may include the holder 1131 and the optical member 1132 seated on the holder 1131.

The holder 1131 may be seated in an accommodating part 1125 of the first housing 1120. The holder 1131 may include a first prism outer surface to a fourth prism outer surface respectively corresponding to the first housing side portion 1121, the second housing side portion 1122, the third housing side portion 1123, and the fourth housing side portion 1124.

A seating groove in which the second magnetic part 1143 may be seated may be disposed in the fourth prism outer surface facing the fourth housing side portion 1124.

The optical member 1132 may be seated on the holder 1131. To this end, the holder 1131 may have a seating surface, and the seating surface may be formed by an accommodating groove. The optical member 1132 may include a reflector disposed therein. However, the present invention is not limited thereto. In addition, the optical member 1132 may reflect light reflected from the outside (e.g., an object) into the camera device. That is, the optical member 1132 can resolve spatial limits of the first camera actuator and the second camera actuator by changing the path of the reflected light. Therefore, it should be understood that the camera device may provide a high range of magnification by extending the optical path while a thickness thereof is minimized.

The rotating unit 1140 includes the rotating plate 1141, the first magnetic part 1142 having the coupling strength with the rotating plate 1141, and the second magnetic part 1143 positioned within the rotating plate 1141.

The rotating plate 1141 may be coupled to the mover 1130 and the first housing 1120. The rotating plate 1141 may include an additional magnetic part (not illustrated) positioned therein.

In addition, the rotating plate 1141 may be disposed adjacent to the optical axis. Therefore, the actuator according to the embodiment may easily change the optical path according to the tilting of the first and second axes to be described below.

The rotating plate 1141 may include first protrusions disposed to be spaced apart from each other in the first direction (X-axis direction) and second protrusions disposed to be spaced apart from each other in the second direction (Y-axis direction). In addition, the first protrusion and the second protrusion may protrude in opposite directions. A detailed description thereof will be made below.

In addition, the first magnetic part 1142 includes a plurality of yokes, and the plurality of yokes may be positioned to face each other based on the rotating plate 1141. In the embodiment, the first magnetic part 1142 may include a plurality of facing yokes. In addition, the rotating plate 1141 may be positioned between the plurality of yokes.

As described above, the first magnetic part 1142 may be positioned in the first housing 1120. In addition, as described above, the first magnetic part 1142 may be seated on an inner surface or outer surface of the fourth housing side portion 1124. For example, the first magnetic part 1142 may be seated in a groove formed in the outer surface of the fourth housing side portion 1124. Alternatively, the first magnetic part 1142 may be seated in the first housing groove 1124a.

In addition, the second magnetic part 1143 may be positioned on an outer surface of the mover 1130, particularly, the holder 1131. With this configuration, the rotating plate 1141 may be easily coupled to the first housing 1120 and the mover 1130 by the coupling strength generated by a magnetic force between the second magnetic part 1143 and the first magnetic part 1142 disposed therein. In the present invention, the positions of the first magnetic part 1142 and the second magnetic part 1143 may be moved.

The first driving unit 1150 includes the first driving magnet 1151, the first driving coil 1152, the first Hall sensor unit 1153, and the first board unit 1154.

The first driving magnet 1151 may include a plurality of magnets. In the embodiment, the first driving magnet 1151 may include a first magnet 1151a, a second magnet 1151b, and a third magnet 1151c.

The first magnet 1151a, the second magnet 1151b, and the third magnet 1151c may each be positioned on the outer surface of the holder 1131. In addition, the first magnet 1151a and the second magnet 1151b may be positioned to face each other. In addition, the third magnet 1151c may be positioned on a lower surface of the outer surface of the holder 1131. A detailed description thereof will be made below.

The first driving coil 1152 may include a plurality of coils. In the embodiment, the first driving coil 1152 may include a first coil 1152a, a second coil 1152b, and a third coil 1152c.

The first coil 1152a may be positioned to face the first magnet 1151a. Therefore, as described above, the first coil 1152*a* may be positioned in the first housing hole 1121*a* of the first housing side portion 1121.

In addition, the second coil 1152*b* may be positioned to face the second magnet 1151*b*. Therefore, as described above, the second coil 1152*b* may be positioned in the second housing hole 1122*a* of the second housing side portion 1122.

The first coil 1152*a* may be positioned to face the second coil 1152*b*. In other words, the first coil 1152*a* may be symmetrically disposed based on the second coil 1152*b* with respect to the first direction (X-axis direction). This may be applied to the first magnet 1151*a* and the second magnet 1151*b* in the same manner. In other words, the first magnet 1151*a* and the second magnet 1151*b* may be symmetrically disposed with respect to the first direction (X-axis direction). In addition, the first coil 1152*a*, the second coil 1152*b*, the first magnet 1151*a*, and the second magnet 1151*b* may be disposed to at least partially overlap in the second direction (Y-axis direction). With this configuration, the X-axis tilting may be accurately performed without bias to one side by the electromagnetic force between the first coil 1152*a* and the first magnet 1151*a* and the electromagnetic force between the second coil 1152*b* and the second magnet 1151*b*.

The third coil 1152*c* may be positioned to face the third magnet 1151*c*. Therefore, as described above, the third coil 1152*c* may be positioned in the third housing hole 1123*a* of the third housing side portion 1123. The third coil 1152*c* may generate an electromagnetic force with the third magnet 1151*c* so that the mover 1130 and the rotating unit 1140 may perform a Y-axis tilting based on the first housing 1120.

Here, the X-axis tilting means a tilting with respect to the X-axis, and the Y-axis tilting means a tilting with respect to the Y-axis.

The first Hall sensor unit 1153 may include a plurality of Hall sensors. The Hall sensor corresponds to and is used interchangeably with "sensor unit" to be described below. In the embodiment, the first Hall sensor unit 1153 may include a first Hall sensor 1153*a*, a second Hall sensor 1153*b*, and a third Hall sensor 1153*c*.

The first Hall sensor 1153*a* may be positioned at an inner side of the first coil 1152*a*. In addition, the second Hall sensor 1153*b* may be disposed symmetrically with the first Hall sensor 1153*a* in the first direction (X-axis direction) and the third direction (Z-axis direction). In addition, the second Hall sensor 1153*b* may be positioned at an inner side of the second coil 1152*b*.

The first Hall sensor 1153*a* may detect a change in a magnetic flux inside the first coil 1152*a*. In addition, the second Hall sensor 1153*b* may detect a change in a magnetic flux in the second coil 1152*b*. Therefore, it is possible to perform position sensing between the first and second magnets 1151*a* and 1151*b* and the first and second Hall sensors 1153*a* and 1153*b*. The first camera actuator according to the embodiment may more accurately control the X-axis tilting by detecting the position through, for example, the first and second Hall sensors 1153*a* and 1153*b*.

In addition, the third Hall sensor 1153*c* may be positioned at an inner side of the third coil 1152*c*. The third Hall sensor 1153*c* may detect a change in a magnetic flux inside the third coil 1152*c*. Therefore, it is possible to perform position sensing between the third magnet 1151*c* and the third Hall sensor 1153*c*. Therefore, the first camera actuator according to the embodiment may control the Y-axis tilting. At least one of the first to third Hall sensors may be provided.

The first board unit 1154 may be positioned under the first driving unit 1150. The first board unit 1154 may be electrically connected to the first driving coil 1152 and the first Hall sensor unit 1153. For example, the first board unit 1154 may be coupled to the first driving coil 1152 and the first Hall sensor unit 1153 by a surface mount technology (SMT). However, the present invention is not limited to this method.

The first board unit 1154 may be positioned between the first shield can (not illustrated) and the first housing 1120 and coupled to the first shield can and the first housing 1120. The coupling method may be variously performed as described above. In addition, through the coupling, the first driving coil 1152 and the first Hall sensor unit 1153 may be positioned within an outer surface of the first housing 1120.

The first board unit 1154 may include a circuit board having wiring patterns that may be electrically connected, such as a rigid printed circuit board (rigid PCB), a flexible printed circuit board (flexible PCB), and a rigid flexible printed circuit board (rigid flexible PCB). However, the present invention is not limited to these types.

FIG. 5 is a perspective view of the first camera actuator according to the embodiment from which a first shield can and a board are removed, FIG. 6 is a cross-sectional view of the first camera actuator along line B-B' in FIG. 5, and FIG. 7 is a cross-sectional view of the first camera actuator along line C-C' in FIG. 5.

Referring to FIGS. 5 to 7, the first coil 1152*a* may be positioned on the first housing side portion 1121.

In addition, the first coil 1152*a* and the first magnet 1151*a* may be positioned to face each other. At least a portion of the first magnet 1151*a* may overlap the first coil 1152*a* in the second direction (Y-axis direction).

In addition, the second coil 1152*b* may be positioned on the second housing side portion 1122. Therefore, the second coil 1152*b* and the second magnet 1151*b* may be positioned to face each other. At least a portion of the second magnet 1151*b* may overlap the second coil 1152*b* in the second direction (Y-axis direction).

In addition, the first coil 1152*a* and the second coil 1152*b* may overlap each other in the second direction (Y-axis direction). In addition, the first magnet 1151*a* and the second magnet 1151*b* may overlap each other in the second direction (Y-axis direction). With this configuration, the electromagnetic force applied to the outer surface of the holder (the first holder outer surface and the second holder outer surface) may be positioned on an axis parallel to the second direction (Y-axis direction) so that the X-axis tilting may be performed accurately and precisely.

In addition, a first accommodating groove (not illustrated) may be positioned in the fourth holder outer surface. In addition, first protrusions PR1*a* and PR1*b* may be disposed in the first accommodating groove. Therefore, when the X-axis tilting is performed, the first protrusions PR1*a* and PR1*b* may be reference axes (or rotation axes) of the tilting. Therefore, the rotating plate 1141 and the mover 1130 may move to a left or right side.

As described above, the second protrusion PR2 may be seated in a groove of an inner surface of the fourth housing side portion 1124. In addition, when the Y-axis tilting is performed, the rotating plate and the mover may rotate using the second protrusion PR2 as a reference axis of the Y-axis tilting.

According to the embodiment, an OIS may be performed by the first protrusion and the second protrusion.

Referring to FIG. 6, the Y-axis tilting may be performed. That is, an OIS can be implemented by rotating the first camera actuator in the first direction (X-axis direction).

In the embodiment, the third magnet 1151*c* disposed under the holder 1131 may generate the electromagnetic force with the third coil 1152c to tilt or rotate the mover 1130 in the first direction (X-axis direction).

Specifically, the rotating plate 1141 may be coupled to the first housing 1120 and the mover 1130 by the first magnetic part 1142 in the first housing 1120 and the second magnetic part 1143 in the mover 1130. In addition, the first protrusions PR1 may be spaced apart in the first direction (X-axis direction) and supported by the first housing 1120.

In addition, the rotating plate 1141 may rotate or tilt using the second protrusion PR2 protruding to the mover 1130 as a reference axis (or a rotation axis). In other words, the rotating plate 1141 may perform the Y-axis tilting using the second protrusion PR2 as the reference axis.

For example, an OIS can be implemented by rotating (X1→X1a or X1b) the mover 130 at a first angle θ1 in the X-axis direction by first electromagnetic forces F1A and F1B between the third magnet 1151c disposed in the third seating groove and the third coil 1152c disposed on the third board side portion. The first angle θ1 may be in a range of ±1° to ±3°. However, the present invention is not limited thereto.

Hereinafter, in the first camera actuators according to various embodiments, the electromagnetic force may move the mover by generating a force in the described direction or move the mover in the described direction even when a force is generated in another direction. In other words, the described direction of the electromagnetic force is a direction of the force generated by the magnet and the coil to move the mover.

Referring to FIG. 7, the X-axis tilting may be performed. In other words, an OIS can be implemented by rotating the mover 1130 in the second direction (Y-axis direction).

The OIS can be implemented by tilting or rotating (or X-axis tilting) the mover 1130 in the Y-axis direction.

In the embodiment, the first magnet 1151a and the second magnet 1151b disposed in the holder 1131 may tilt or rotate the rotating plate 1141 and the mover 1130 in the second direction (Y-axis direction) by respectively generating the electromagnetic force with the first coil 1152a and the second coil 1152b.

The rotating plate 1141 may rotate or tilt (X-axis tilting) in the second direction using the first protrusion PR1 as a reference axis (or a rotation axis).

For example, an OIS can be implemented by rotating (Y1→Y1a, Y1b) the mover 130 at a second angle θ2 in the Y-axis direction by second electromagnetic forces F2A and F2B between the first and second magnets 1151a and 1151b disposed in the first seating groove and the first and second coils 1152a and 1152b disposed on the first and second board side portions. The second angle θ2 may be in a range of ±1° to ±3°. However, the present invention is not limited thereto.

In addition, as described above, the electromagnetic forces generated by the first and second magnets 1151a and 1151b and the first and second coils 1152a and 1152b may act in the third direction or in a direction opposite to the third direction. For example, the electromagnetic force may be generated on a left side portion of the mover 1130 in the third direction (Z-axis direction) and act on a right side portion of the mover 1130 in a direction opposite to the third direction (Z-axis direction). Therefore, the mover 1130 may rotate with respect to the first direction. Alternatively, the mover 130 may move in the second direction.

As described above, the first camera actuator according to the embodiment may control the rotating plate 1141 and the mover 1130 to rotate in the first direction (X-axis direction) or the second direction (Y-axis direction) by the electromagnetic force between the first driving magnet in the holder and the first driving coil disposed in the housing, thereby minimizing the occurrence of a decentering or tilting phenomenon and providing the best optical characteristics for implementing the OIS. In addition, as described above, "Y-axis tilting" may correspond to rotating or tilting in the first direction (X-axis direction). In addition, "X-axis tilting" may correspond to rotating or tilting in the second direction (Y-axis direction).

FIG. 8 is a perspective view of a second camera actuator according to the embodiment, FIG. 9 is an exploded perspective view of the second camera actuator according to the embodiment, FIG. 10 is a cross-sectional view of the second camera actuator along line D-D' in FIG. 8, FIGS. 11 and 12 are views for describing each driving operation of a lens assembly according to the embodiment, and FIG. 13 is a view for describing the driving of the second camera actuator according to the embodiment.

Referring to FIGS. 8 to 10, the second camera actuator 1200 according to the embodiment may include a lens unit 1220, a second housing 1230, a second driving unit 1250, a base unit 1260, a second board unit 1270, and a bonding member 1280. Furthermore, the second camera actuator 1200 may further include a second shield can (not illustrated), an elastic unit (not illustrated), and a bonding member (not illustrated).

The second shield can (not illustrated) may be positioned in one area (e.g., an outermost side) of the second camera actuator 1200 and positioned to surround the components (the lens unit 1220, the second housing 1230, the second driving unit 1250, the base unit 1260, the second board unit 1270, and an image sensor (IS)) to be describe below.

The second shield can (not illustrated) can block or attenuate electromagnetic waves generated from the outside. Therefore, it is possible to reduce the occurrence of malfunction in the second driving unit 1250.

The lens unit 1220 may be positioned in the second shield can (not illustrated). The lens unit 1220 may move in the third direction (Z-axis direction or optical axis direction). Therefore, the above-described AF function or zooming function can be performed.

In addition, the lens unit 1220 may be positioned in the second housing 1230. Therefore, at least a portion of the lens unit 1220 may move in the second housing 1230 in the optical axis direction or the third direction (Z-axis direction).

Specifically, the lens unit 1220 may include a lens group 1221 and a moving assembly 1222.

First, the lens group 1221 may include at least one lens. In addition, although a plurality of lens groups 1221 may be formed, the following description will be made based on one lens group.

The lens group 1221 may be coupled to the moving assembly 1222 and moved in the third direction (Z-axis direction) by an electromagnetic force generated from a fourth magnet 1252a and a fifth magnet 1252b coupled to the moving assembly 1222.

In the embodiment, the lens group 1221 may include a first lens group 1221a, a second lens group 1221b, and a third lens group 1221c. The first lens group 1221a, the second lens group 1221b, and the third lens group 1221c may be sequentially disposed in the optical axis direction. Furthermore, the lens group 1221 may further include a fourth lens group 1221d. The fourth lens group 1221d may be disposed behind the third lens group 1221c.

The first lens group 1221a may be fixedly coupled to a second-first housing. In other words, the first lens group 1221a may not move in the optical axis direction.

The second lens group 1221*b* may be coupled to a first lens assembly 1222*a* to move in the third direction or the optical axis direction. Magnification adjustment may be performed by moving the first lens assembly 1222*a* and the second lens group 1221*b*.

The third lens group 1221*c* may be coupled to the second lens assembly 1222*b* to move in the third direction or the optical axis direction. Focus adjustment or auto focusing may be performed by moving the third lens group 1221.

However, the present invention is not limited to the number of lens groups, and the fourth lens group 1221*d* may not be present, or additional lens groups or the like other than the fourth lens group 1121*d* may be further disposed.

The moving assembly 1222 may include an opening area surrounding the lens group 1221. The moving assembly 1222 is used interchangeably with the lens assembly. In addition, the moving assembly 1222 may be coupled to the lens group 1221 by various methods. In addition, the moving assembly 1222 may include a groove in a side surface thereof and may be coupled to the fourth magnet 1252*a* and the fifth magnet 1252*b* through the groove. A coupling member or the like may be applied to the groove.

In addition, the moving assembly 1222 may be coupled to the elastic units (not illustrated) at an upper end and a rear end thereof. Therefore, the moving assembly 1222 may be supported by the elastic units (not illustrated) while moving in the third direction (Z-axis direction). In other words, the position of the moving assembly 1222 may be maintained in the third direction (Z-axis direction). The elastic unit (not illustrated) may be formed of various elastic elements such as a leaf spring.

The moving assembly 1222 may be positioned in the second housing 1230 and may include the first lens assembly 1222*a* and a second lens assembly 1222*b*.

An area of the second lens assembly 1222*b* in which the third lens group is seated may be positioned behind the first lens assembly 1222*a*. In other words, the area of the second lens assembly 1222*b* in which the third lens group 1221*c* is seated may be positioned between an area of the first lens assembly 1222*a* in which the second lens group 1221*b* is seated and the image sensor.

The first lens assembly 1222*a* and the second lens assembly 1222*b* may face a first guide unit G1 and a second guide unit G2, respectively. The first guide unit G1 and the second guide unit G2 may be positioned on a first side portion and a second side portion of the second housing 1230 to be described below. A detailed description thereof will be made below.

In addition, a second driving magnet may be seated on outer surfaces of the first lens assembly 1222*a* and the second lens assembly 1222*b*. For example, the fifth magnet 1252*b* may be seated on an outer surface of the second lens assembly 1222*b*. The fourth magnet 1252*a* may be seated on the outer surface of the first lens assembly 1222*a*.

The second housing 1230 may be disposed between the lens unit 1220 and the second shield can (not illustrated). In addition, the second housing 1230 may be disposed to surround the lens unit 1220.

The second housing 1230 may include a second-first housing 1231 and a second-second housing 1232. The second-first housing 1231 may be coupled to the first lens group 1221*a* and may also be coupled to the above-described first camera actuator. The second-first housing 1231 may be positioned in front of the second-second housing 1232.

In addition, the second-second housing 1232 may be positioned behind the second-first housing 1231. The lens unit 1220 may be seated inside the second-second housing 1232.

A hole may be formed in a side portion of the second housing 1230 (or the second-second housing 1232). A fourth coil 1251*a* and a fifth coil 1251*b* may be disposed in the hole. The hole may be positioned to correspond to the above-described groove of the moving assembly 1222. In this case, a plurality of fourth coils 1251*a* and fifth coils 1251*b* may be formed.

In the embodiment, the second housing 1230 (in particular, the second-second housing 1232) may include a first side portion 1232*a* and a second side portion 1232*b*. The first side portion 1232*a* and the second side portion 1232*b* may be positioned to correspond to each other. For example, the first side portion 1232*a* and the second side portion 1232*b* may be symmetrically disposed with respect to the third direction. A second driving coil 1251 may be positioned on the first side portion 1232*a* and the second side portion 1232*b*. In addition, the second board unit 1270 may be seated on outer surfaces of the first side portion 1232*a* and the second side portion 1232*b*. In other words, a first board 1271 may be positioned on an outer surface of the first side portion 1232*a*, and a second board 1272 may be positioned on an outer surface of the second side portion 1232*b*.

Furthermore, the first guide unit G1 and the second guide unit G2 may be positioned on the first side portion 1232*a* and the second side portion 1232*b* of the second housing 1230 (in particular, the second-second housing 1232).

The first guide unit G1 and the second guide unit G2 may be positioned to correspond to each other. For example, the first guide unit G1 and the second guide unit G2 may be positioned to face each other with respect to the third direction (Z-axis direction). In addition, the first guide unit G1 and the second guide unit G2 may at least partially overlap each other in the second direction (Y-axis direction).

The first guide unit G1 and the second guide unit G2 may include at least one groove (e.g., a guide groove) or recess. In addition, a first ball B1 or a second ball B2 may be seated in the groove or the recess. Therefore, the first ball B1 or the second ball B2 may move in the guide groove of the first guide unit G1 or the guide groove of the second guide unit G2 in the third direction (Z-axis direction).

Alternatively, the first ball B1 or the second ball B2 may move in the third direction along a rail formed at an inner side of the first side portion 1232*a* of the second housing 1230 or a rail formed at an inner side of the second side portion 1232*b* of the second housing 1230.

Therefore, the first lens assembly 1222*a* and the second lens assembly 1222*b* may move in the third direction.

According to the embodiment, the first ball B1 may be disposed on an upper portion of the first lens assembly 1222*a* or the second lens assembly 1222*b*. In addition, the second ball B2 may be disposed on a lower portion of the first lens assembly 1222*a* or the second lens assembly 1222*b*. For example, the first ball B1 may be positioned above the second ball B2. Therefore, at least a portion of the first ball B1 may overlap the second ball B2 in the first direction (X-axis direction) depending on a position.

In addition, the first guide unit G1 and the second guide unit G2 may include first guide grooves GG1*a* and GG2*a* facing a first recess RS1. In addition, the first guide unit G1 and the second guide unit G2 may include second guide grooves GG1*b* and GG2*b* facing a second recess RS2. The first guide grooves GG1*a* and GG2*a* and the second guide grooves GG1*b* and GG2*b* may be grooves extending in the third direction (Z-axis direction). In addition, the first guide grooves GG1a and GG2a and the second guide grooves GG1b and GG2b may be grooves having different shapes. For example, the first guide grooves GG1a and GG2a may be grooves having inclined side surfaces, and the second guide grooves GG1b and GG2b may be grooves having side surfaces perpendicular to lower surfaces.

The fifth magnet 1252b may be positioned to face the fifth coil 1251b. In addition, the fourth magnet 1252a may be positioned to face the fourth coil 1251a.

For example, at least one of the fourth coil 1251a and the fifth coil 1251b may include a plurality of coils. For example, the second driving coil 1251 may include a first sub coil SC1, a second sub coil SC2, and a third sub coil SC3. The first sub coil SC1, the second sub coil SC2, and the third sub coil SC3 may be disposed in the optical axis direction (Z axis direction). In addition, the third sub coil SC3 may be disposed between the first sub coil SC1 and the second sub coil SC2. For example, the first sub coil SC1, the third sub coil SC3, and the second sub coil SC2 may be sequentially disposed in the optical axis direction. In addition, the first sub coil SC1 may be disposed closest to the first camera actuator among the first sub coil SC1, the second sub coil SC2, and the third sub coil SC3. In addition, the second sub coil SC2 may be disposed closest to the image sensor among the first sub coil SC1, the second sub coil SC2, and the third sub coil SC3.

The elastic unit (not illustrated) may include a first elastic member (not illustrated) and a second elastic member (not illustrated). The first elastic member (not illustrated) may be coupled to an upper surface of the moving assembly 1222. The second elastic member (not illustrated) may be coupled to a lower surface of the moving assembly 1222. In addition, the first elastic member (not illustrated) and the second elastic member (not illustrated) may be formed of leaf springs as described above. In addition, the first elastic member (not illustrated) and the second elastic member (not illustrated) may provide elasticity for moving the moving assembly 1222. However, the present invention is not limited to the above-described position, and the elastic unit may be disposed at various positions.

In addition, the second driving unit 1250 may provide a driving force for moving the lens unit 1220 in the third direction (Z-axis direction). The second driving unit 1250 may include the second driving coil 1251 and the second driving magnet 1252. Furthermore, the second driving unit 1250 may further include a second Hall sensor unit. The second Hall sensor unit 1253 may include at least one fourth Hall sensor 1253a and may be positioned at an inner side or outer side of the second driving coil 1251.

The moving assembly may be moved in the third direction (Z-axis direction) by the electromagnetic force generated between the second driving coil 1251 and the second driving magnet 1252.

The second driving coil 1251 may include the fourth coil 1251a and the fifth coil 1251b. In addition, as described above, at least one of the fourth coil 1251a and the fifth coil 1251b may include a plurality of sub coils. In addition, the fourth coil 1251a and the fifth coil 1251b may be disposed in the holes formed in the side portions of the second housing 1230. In addition, the fourth coil 1251a and the fifth coil 1251b may be electrically connected to the second board unit 1270. Therefore, the fourth coil 1251a and the fifth coil 1251b may receive a current or the like through the second board unit 1270.

In addition, the second driving coil 1251 may be coupled to the second board unit 1270 through a yoke or the like.

Furthermore, in the embodiment, the second driving coil 1251 is a fixed element together with the second board unit 1270. In contrast, the second driving magnet 1252 is a moving element that moves in the optical axis direction (Z-axis direction) together with the first and second assemblies.

The second driving magnet 1252 may include the fourth magnet 1252a and the fifth magnet 1252b. The fourth magnet 1252a and the fifth magnet 1252b may be disposed in the above-described groove of the moving assembly 1222 and positioned to correspond to the fourth coil 1251a and the fifth coil 1251b. In addition, the second driving magnet 1252 may be coupled to the first and second lens assemblies (or the moving assembly) together with the yoke to be described below.

The base unit 1260 may be positioned between the lens unit 1220 and the image sensor IS. A component such as a filter may be fixed to the base unit 1260. In addition, the base unit 1260 may be disposed to surround the above-described image sensor. With this configuration, since the image sensor is free from foreign substances and the like, it is possible to improve the reliability of the device. However, the following description will be made with this removed from some drawings.

In addition, the second camera actuator 1200 may be a zoom actuator or an AF actuator. For example, the second camera actuator 1200 may support one lens or a plurality of lenses and perform an AF function or a zooming function by moving the lenses according to a predetermined control signal of a control unit.

In addition, the second camera actuator may be a fixed zoom or a continuous zoom. For example, the second camera actuator may provide the movement of the lens group 1221.

In addition, the second camera actuator may be formed of a plurality of lens assemblies. For example, at least one of a third lens assembly (not illustrated) in addition to the first lens assembly 1222a and the second lens assembly 1222b, and a guide pin (not illustrated) may be disposed in the second camera actuator. In this regard, the above-described contents may be applied. Therefore, the second camera actuator may perform a high-magnification zooming function through the second driving unit. For example, the first lens assembly 1222a and the second lens assembly 1222b may be moving lenses that move through the second driving unit and the guide pin (not illustrated), and the third lens assembly (not illustrated) may be a fixed lens, but the present invention is not limited thereto. For example, the third lens assembly (not illustrated) may perform a function of a focator by which light forms an image at a specific position, and the first lens assembly may perform a function of a variator for re-forming an image formed by the third lens assembly (not illustrated), which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the second lens assembly 1222*b* which is the variator. However, the configuration of the embodiment will be described with reference to the following drawings.

The image sensor may be positioned at the inner side or the outer side of the second camera actuator. In an embodiment, as illustrated, the image sensor may be positioned at the outer side of the second camera actuator. For example, the image sensor may be positioned on a circuit board. The image sensor may receive light and convert the received light into an electrical signal. In addition, the image sensor may include a plurality of pixels in the form of an array. In addition, the image sensor may be positioned on the optical axis.

The second board unit 1270 may be in contact with the second housing side portion. For example, the second board unit 1270 may be positioned on an outer surface (first side surface) of the first side portion and an outer surface (second side surface) of the second side portion of the second housing, in particular, the second-second housing and may be in contact with the first side surface and the second side surface.

Referring to FIGS. 11 and 12, hereinafter, the electromagnetic force will be described below based on one coil. In the camera device according to the embodiment, an electromagnetic force DEM1 between the fourth magnet 1252*a* and the fourth coil 1251*a* may be generated so that the first lens assembly 1222*a* may move along the rail positioned on the inner surface of the housing through the first ball B1 in a direction parallel to the optical axis, that is, the third direction (Z-axis direction) or in a direction opposite to the third direction.

Specifically, in the camera device according to the embodiment, the fourth magnet 1252*a* may be provided in the first lens assembly 1222*a*, for example, by a bipolar magnetization method. For example, in the embodiment, both an N pole and an S pole of the fourth magnet 1252*a* may be positioned to face the fourth coil 1251*a*. Therefore, each of the N pole and the S pole of the fourth magnet 1252*a* may be disposed to correspond to an area in which a current flows in the fourth coil 1251*a* in the X-axis direction or a direction opposite to the X-axis direction.

In the embodiment, when a magnetic force is applied from the N pole of the fourth magnet 1252*a* in a direction opposite to the second direction (Y-axis direction) and a current DE1 flows in the fourth coil 1251*a* corresponding to the N pole in a direction opposite to the first direction (X-axis direction), the electromagnetic force DEM1 may act in the third direction (Z-axis direction) according to the interaction of the electromagnetic force (e.g., Fleming's left hand rule).

In addition, in the embodiment, when a magnetic force is applied from the S pole of the fourth magnet 1252*a* in the second direction (Y-axis direction) and the current DE1 flows in the fourth coil 1251*a* corresponding to the S pole in the first direction (X-axis direction), the electromagnetic force DEM1 may act in the Z-axis direction according to the interaction of the electromagnetic force.

At this time, since the fourth coil 1251*a* is in a state of being fixed to the second housing side portion, the first lens assembly 1222*a* on which the fourth magnet 1252*a* is disposed may move in the direction opposite to the Z-axis direction by the electromagnetic force DEM1 according to the current direction. In other words, the second driving magnet may move in an opposite direction of the electromagnetic force applied to the second driving coil. In addition, the direction of the electromagnetic force may be changed depending on the current of the coil and the magnetic force of the magnet.

Therefore, the first lens assembly 1222*a* may move along the rail positioned on the inner surface of the housing through the first ball B1 in a direction (both directions) parallel to the third direction or the optical axis direction. At this time, the electromagnetic force DEM1 may be controlled in proportion to the current DE1 applied to the fourth coil 1251*a*.

The first lens assembly 1222*a* or the second lens assembly 1222*b* may include the first recess RS1 in which the first ball B1 is seated. In addition, the first lens assembly 1222*a* or the second lens assembly 1222*b* may include the second recess RS2 in which the second ball B2 is seated. A length of the first recess RS1 may be preset in the optical axis direction (Z-axis direction). In addition, a length of the second recess RS2 may be preset in the optical axis direction (Z-axis direction). Therefore, moving distances of the first ball B1 and the second ball B2 in the optical axis direction in each recess may be adjusted. In other words, the first recess RS1 or the second recess RS2 may be a stopper for the first and second balls B1 and B2.

In addition, in the camera device according to the embodiment, the fifth magnet 1252*b* may be provided on the second lens assembly 1222*b* by, for example, the bipolar magnetization method or the like. For example, in the embodiment, both the N pole and the S pole of the fifth magnet 1252*b* may be positioned to face the fifth coil 1251*b*. Therefore, each of the N pole and the S pole of the fifth magnet 1252*b* may be disposed to correspond to an area in which a current flows in the fifth coil 1251*b* in the X-axis direction or a direction opposite to the X-axis direction.

In the embodiment, when a magnetic force DM2 is applied from the N pole of the fifth magnet 1252*b* in the second direction (Y-axis direction) and the current DE2 flows in the fifth coil 1251*b* corresponding to the N pole in the first direction (X-axis direction), an electromagnetic force DEM2 may act in the third direction (Z-axis direction) according to the interaction of the electromagnetic force (e.g., Fleming's left hand rule).

In addition, in the embodiment, when a magnetic force is applied from the S pole of the fifth magnet 1252*b* in a direction opposite to the second direction (Y-axis direction) and the current DE2 flows in the fifth coil 1251*b* corresponding to the S pole in a direction opposite to the first direction (X-axis direction), the electromagnetic force DEM2 may act in the Z-axis direction according to the interaction of the electromagnetic force.

At this time, since the fifth coil 1251*b* is in a state of being fixed to the second housing side portion, the second lens assembly 1222*b* on which the fifth magnet 1252*b* is disposed may be moved in a direction opposite to the Z-axis direction by the electromagnetic force DEM2 according to the current direction. For example, as described above, the direction of the electromagnetic force may be changed depending on the current of the coil and the magnetic force of the magnet. Therefore, the second lens assembly 1222*b* may move along the rail positioned on the inner surface of the second housing through the second ball B2 in a direction parallel to the third direction (Z-axis direction). At this time, the electromagnetic force DEM2 may be controlled in proportion to the current DE2 applied to the fifth coil 1251*b*.

Referring to FIG. 13, in the camera device according to the embodiment, the second driving unit may provide driving forces F3A, F3B, F4A, and F4B that move the first lens assembly 1222*a* and the second lens assembly 1222*b* of the lens unit 1220 in the third direction (Z-axis direction). As described above, the second driving unit may include the second driving coil 1251 and the second driving magnet

1252. In addition, the lens unit 1220 may be moved in the third direction (Z-axis direction) by the electromagnetic force generated between the second driving coil 1251 and the second driving magnet 1252.

At this time, the fourth coil 1251a and the fifth coil 1251b may be disposed in the holes formed in the side portions (e.g., the first side portion and the second side portion) of the second housing 1230. In addition, the fifth coil 1251b may be electrically connected to the first board 1271. The fourth coil 1251a may be electrically connected to the second board 1272. Therefore, the fourth coil 1251a and the fifth coil 1251b may receive a driving signal (e.g., a current) from a driving driver on the circuit board 1300 through the second board unit 1270.

At this time, the first lens assembly 1222a on which the fourth magnet 1252a is seated may move in the third direction (Z-axis direction) by the electromagnetic forces F3A and F3B between the fourth coil 1251a and the fourth magnet 1252a. In addition, the second lens group 1221b seated on the first lens assembly 1222a may also move in the third direction.

In addition, the second lens assembly 1222b on which the fifth magnet 1252b is seated may be moved in the third direction (Z-axis direction) by the electromagnetic forces F4A and F4B between the fifth coil 1251b and the fifth magnet 1252b. In addition, the third lens group 1221c seated on the second lens assembly 1222b may also move in the third direction.

Therefore, as described above, a focal length or magnification of the optical system may be changed by moving the second lens group 1221b and the third lens group 1221c. In the embodiment, the magnification may be changed by moving the second lens group 1221b. In other words, zooming may be performed. In addition, a focus may be adjusted by moving the third lens group 1221c. In other words, auto focusing may be performed. With this configuration, the second camera actuator may be a fixed zoom or a continuous zoom.

FIG. 14 is a schematic diagram illustrating a circuit board according to the embodiment.

Referring to FIG. 14, as described above, the circuit board 1300 according to the embodiment may include a first circuit board unit 1310 and a second circuit board unit 1320. The first circuit board unit 1310 may be positioned under the base and coupled to the base. In addition, the image sensor IS may be disposed on the first circuit board unit 1310. In addition, the first circuit board unit 1310 and the image sensor IS may be electrically connected.

In addition, the second circuit board unit 1320 may be positioned on a side portion of the base. In particular, the second circuit board unit 1320 may be positioned on a first side portion of the base. Therefore, the second circuit board unit 1320 may be positioned adjacent to the fourth coil positioned adjacent to the first side portion for easy electrical connection.

Furthermore, the circuit board 1300 may further include a fixed board (not illustrated) positioned on a side surface thereof. Therefore, even when the circuit board 1300 is made of a flexible material, the circuit board 1300 may be coupled to the base while maintaining stiffness by the fixed board.

The second circuit board unit 1320 of the circuit board 1300 may be positioned on the side portion of the second driving unit 1250. The circuit board 1300 may be electrically connected to the first driving unit and the second driving unit. For example, the electrical connection may be made by the SMT. However, the present invention is not limited to this method.

The circuit board 1300 may include a circuit board having wiring patterns that may be electrically connected, such as a rigid PCB, a flexible PCB, and a rigid flexible PCB. However, the present invention is not limited to these types.

In addition, the circuit board 1300 may be electrically connected to another camera module in the terminal or a processor of the terminal. Therefore, the above-described camera actuator and camera device including the same may transmit and receive various signals within the terminal.

FIG. 15 is a perspective view of a first lens assembly, a first bonding member, a second bonding member, and a second lens assembly according to the embodiment, FIG. 16 is a view illustrating a second driving coil according to the embodiment, and FIG. 17 is an enlarged view illustrating some of a plurality of turns in the second driving coil according to the embodiment.

Referring to FIG. 15, the first lens assembly 1222a and the second lens assembly 1222b may be disposed to be spaced apart from each other in the optical axis direction (Z-axis direction). In addition, the first lens assembly 1222a and the second lens assembly 1222b may be moved in the optical axis direction (Z-axis direction) by the second driving unit. For example, an auto focus or zooming function may be performed by moving the first lens assembly 1222a and the second lens assembly 1222b.

In addition, the first lens assembly 1222a may include a first lens holder LAH1 for holding and coupling the second lens group 1221b. The first lens holder LAH1 may be coupled to the second lens group 1221b. In addition, the first lens holder LAH1 may include a first lens hole LH1 for accommodating the second lens group 1221b. In other words, the second lens group 1221b including at least one lens may be disposed in the first lens hole LH1. The first guide unit G1 may be disposed to be spaced apart from one side of the first lens holder LAH1. For example, the first guide unit G1 and the first lens holder LAH1 may be sequentially disposed in the second direction (Y-axis direction).

In addition, the second lens assembly 1222b may include a second lens holder LAH2 for holding and coupling the third lens group 1221c. In addition, the second lens holder LAH2 may include a second lens hole LH2 for accommodating the third lens group 1221c. In other words, at least one lens may be disposed in the second lens hole LH2.

The second guide unit G2 may be disposed at the other side of the second lens holder LAH2. The second guide unit G2 may be disposed to face the first guide unit G1.

In the embodiment, the first guide unit G1 and the second guide unit G2 may at least partially overlap each other in the second direction (Y-axis direction). With this configuration, it is possible to increase the space efficiency of the second driving unit for moving the first and second lens assemblies within the second camera actuator, thereby easily miniaturizing the second camera actuator.

In addition, the second guide unit G2 and the second lens holder LAH2 may be sequentially disposed in a direction opposite to the second direction (Y-axis direction).

The first ball, the fourth coil, and the like may be disposed in the first guide unit G1 as described above, and the second ball, the fifth coil, and the like may be disposed in the second guide unit G2 as described above.

In the embodiment, each of the first lens assembly 1222a and the second lens assembly 1222b may include outer surfaces adjacent to each other. The first lens assembly 1222a may include a first outer surface M1, and the second lens assembly 1222b may include a second outer surface M2. The first outer surface M1 may be a lower surface of the first lens holder LAH1 with respect to the optical axis direction (Z-axis direction). In addition, a third outer surface M3 to be described below may be an upper surface of the first lens holder LAH1. In addition, the second outer surface M2 may be an upper surface of the second lens holder LAH2, and the fourth outer surface M4 may be the lower surface of the second lens holder LAH2.

In addition, the first outer surface M1 and the second outer surface M2 may at least partially overlap each other in the optical axis direction (Z-axis direction). In the embodiment, the first outer surface M1 to the fourth outer surface M4 may at least partially overlap each other in the optical axis direction (Z-axis direction).

For example, a bonding member (not illustrated) may be in contact with at least one of the first outer surface M1 and the second outer surface M2.

Referring to FIGS. 16 and 17, the second driving coil includes the fourth coil 1251a and the fifth coil 1251b. The following description will be made based on the second driving coil including the fourth coil and the fifth coil.

As described above, the second driving coil 1251a or 1251b (described as "1251a") according to this embodiment may be formed of a plurality of coils. In addition, the second driving coil 1251a may be formed of at least one winding or turn. The following description will be made based on the second driving coil 1251a formed with a plurality of turns.

In the embodiment, the second driving coil 1251a may include the first sub coil SC1, the second sub coil SC2, and the third sub coil SC3.

The first sub coil SC1, the second sub coil SC2, and the third sub coil SC3 may be disposed in the optical axis direction (Z axis direction). The third sub coil SC3 may be disposed between the first sub coil SC1 and the second sub coil SC2. For example, the first sub coil SC1, the third sub coil SC3, and the second sub coil SC2 may be sequentially disposed in the optical axis direction (Z axis direction).

In addition, according to the embodiment, a length L3 of the third sub coil SC3 in the optical axis direction (Z-axis direction) may be larger than a length L1 or L2 of at least one of the first sub coil SC1 and the second sub coil SC2 in the optical axis direction (Z-axis direction).

In addition, according to the embodiment, a length L3 of the third sub coil SC3 in the optical axis direction (Z-axis direction) may be larger than a length L1 or L2 of at least one of the first sub coil SC1 and the second sub coil SC2 in the optical axis direction (Z-axis direction).

In addition, the length L1 of the first sub coil SC1 in the optical axis direction (Z-axis direction) may be different from or the same as the length L2 of the second sub coil SC2 in the optical axis direction (Z-axis direction). For example, the length L1 of the first sub coil SC1 in the optical axis direction (Z-axis direction) may be different from or the same as the length L2 of the second sub coil SC2 in the optical axis direction (Z-axis direction). With this configuration, the second driving magnet may be moved in the optical axis direction (Z-axis direction) by the uniform electromagnetic force at a similar moving speed regardless of a position.

In addition, a length L4 between innermost turns MIT among the plurality of turns (or unit patterns) in the optical axis direction (Z-axis direction) in the first sub coil SC1 may be the same as a length L5 between the innermost turns MIT among the plurality of turns (or the unit patterns) in the optical axis direction (Z-axis direction) in the second sub coil SC2. With this configuration, the second driving magnet may be moved in the optical axis direction (Z-axis direction) by the uniform electromagnetic force at a similar moving speed regardless of a position.

In addition, a length L6 between the innermost turns MIT among the plurality of turns (or the unit patterns) in the optical axis direction (Z-axis direction) in the third sub coil SC3 according to the embodiment may be larger than the length L4 between the innermost turns MIT among the plurality of turns (or the unit patterns) in the optical axis direction (Z-axis direction) in the first sub coil SC1. The length L6 between innermost turns MIT among the plurality of turns (or the unit patterns) in the optical axis direction (Z-axis direction) in the third sub coil SC3 according to the embodiment may be larger than the length L5 between the innermost turns MIT among the plurality of turns (or the unit patterns) in the optical axis direction (Z-axis direction) in the second sub coil SC2. With this configuration, in the second camera actuator according to the embodiment, the first and second lens assemblies may be moved or driven as much as an increased or increased moving distance in the optical axis direction (Z-axis direction).

In addition, a length H1 of the first sub coil SC1 in the first direction (X-axis direction) or in a vertical direction may be the same as a length H2 of the second sub coil SC2 in the first direction (X-axis direction) or in the vertical direction. With this configuration, the second driving magnet may be moved in the optical axis direction (Z-axis direction) by the uniform electromagnetic force at a similar moving speed regardless of a position.

In addition, the length H1 of the first sub coil SC1 in the first direction (X-axis direction) or in the vertical direction may correspond to a maximum length between outermost turns MOT among the plurality of turns in the first direction (X-axis direction) in the first sub coil SC1. In addition, the length H2 of the second sub coil SC2 in the first direction (X-axis direction) or in the vertical direction may correspond to the maximum length between the outermost turns MOT among the plurality of turns in the first direction (X-axis direction) in the second sub coil SC2. In addition, a length H6 of the third sub coil SC3 in the first direction (X-axis direction) or in the vertical direction may correspond to a maximum length between the outermost turns MOT among the plurality of turns in the first direction (X-axis direction) in the third sub coil SC3.

In addition, the length H1 of the first sub coil SC1 in the first direction (X-axis direction) or in the vertical direction may be different from or the same as the length H6 of the third sub coil SC3 in the first direction (X-axis direction) or in the vertical direction. In addition, the length H2 of the second sub coil SC2 in the first direction (X-axis direction) or in the vertical direction may be different from or the same as the length H6 of the third sub coil SC3 in the first direction (X-axis direction) or in the vertical direction. With this configuration, it is possible to decrease the length of the second camera actuator according to the embodiment in a thickness direction or in the vertical direction, thereby increasing the stroke of each lens assembly in the optical axis direction while achieving miniaturization.

In addition, the first sub coil SC1 according to the embodiment may include a first coil area CA1 extending in the vertical direction or in the first direction (X-axis direction). In addition, the second sub coil SC2 according to the embodiment may include a second coil area CA2 extending in the vertical direction or in the first direction (X-axis direction). In addition, the third sub coil SC3 according to the embodiment may include a third coil area CA3 extending in the vertical direction or in the first direction (X-axis direction). Additionally, the first sub coil SC1, the second sub coil SC2, and the third sub coil SC3 may include an area ("horizontal area") extending in the optical axis direction (Z-axis direction) and a curve pattern area connecting the horizontal area to each coil area. In addition, in the above-described each coil area, horizontal area, and curve pattern area, the plurality of turns or unit patterns may be disposed or wound while having a predetermined separation distance from adjacent patterns. Hereinafter, the above-described coil area will be described.

In addition, the first coil area CA1 may include a first-first coil area CA11 adjacent to the third sub coil SC3 and a first-second coil area CA12 spaced apart from the first-first coil along the optical axis.

In addition, the second coil area CA2 may include a second-first coil area CA21 adjacent to the third sub coil SC3 and a second-second coil area CA22 spaced apart from the second-first coil area CA21 along the optical axis.

In addition, the third coil area CA3 may include a third-first coil area CA31 adjacent to the first sub coil SC1 and a third-second coil area CA32 spaced apart from the third-first coil area CA31 along the optical axis.

In addition, the length L6 between an innermost turn MIT among the plurality of turns in the third-first coil area CA31 and an innermost turn MIT among the plurality of turns in the third-second coil area CA32 in the optical axis direction may be larger than the length L4 or L5 of the first sub coil SC1 or the second sub coil SC2 in the optical axis direction. Furthermore, a length H4 between the innermost turns or the unit patterns among the plurality of turns in the first direction (X-axis direction) in the first sub coil SC1 may be different from or the same as a length H5 between the innermost turns or the unit patterns among the plurality of turns in the first direction (X-axis direction) in the second sub coil SC2. In addition, the length H4 between the innermost turns or the unit patterns among the plurality of turns in the first direction (X-axis direction) in the first sub coil SC1 may be different from or the same as a length H3 between the innermost turns or the unit patterns among the plurality of turns in the first direction (X-axis direction) in the third sub coil SC3. The following description will be made based on the same case. Therefore, it is possible to decrease the length of the camera actuator according to the embodiment in the thickness direction or in the vertical direction, thereby providing easy miniaturization.

In addition, a gap gap1 between adjacent patterns (or turns) in the first coil area CA1 (the first-first coil area CA11 or the first-second coil area CA12) may be the same as a gap gap2 between adjacent patterns (or turns) in the second coil area CA2 (the second-first coil area or the second-second coil area).

In addition, the gap gap1 between adjacent patterns (or turns) in the first coil area CA1 (the first-first coil area CA11 or the first-second coil area CA12) may be different from or the same as a gap gap3 between adjacent patterns (or turns) in the third coil area CA3 (the third-first coil area or the third-second coil area). The following description will be made based on the same case.

Furthermore, a length W1 of the unit pattern (or turn) in the optical axis direction (Z-axis direction) in the first coil area CA1 may be the same as a length W2 of the unit pattern (or turn) in the optical axis direction (Z-axis direction) in the second coil area CA2. In addition, the length W1 of the unit pattern (or turn) in the optical axis direction (Z-axis direction) in the first coil area CA1 may be different from or the same as a length W3 of the unit pattern (or turn) in the optical axis direction (Z-axis direction) in the third coil area CA3.

Furthermore, a length W4 of the unit pattern (or turn) in the first axis direction (X-axis direction) in the horizontal area of the first sub coil SC1 may be the same as a length W5 of the unit pattern (or turn) in the first direction (X-axis direction) in the horizontal area of the second sub coil SC2. In addition, the length W4 of the unit pattern (or turn) in the first axis direction (X-axis direction) in the horizontal area of the first sub coil SC1 may be different from or the same as a length W6 of the unit pattern (or turn) in the first direction (X-axis direction) in the horizontal area of the third sub coil SC3. The following description will be made based on the same case.

In addition, a length gap4 between adjacent unit patterns (or turns) in the first direction (X-axis direction) in the horizontal area of the first sub coil SC1 may be the same as a length gap5 between adjacent unit patterns (or turns) in the first direction (X-axis direction) in the horizontal area of the second sub coil SC2. In addition, the length gap4 between the adjacent unit patterns (or turns) in the first direction (X-axis direction) in the horizontal area of the first sub coil SC1 may be different from or the same as a length gap6 between adjacent unit patterns (or turns) in the first direction (X-axis direction) in the horizontal area of the third sub coil SC3. The following description will be made based on the same case.

In addition, in the specification, as described above, the second driving coil 1251a may include the first sub coil SC1, the second sub coil SC2, and the third sub coil SC3.

In addition, each of the first sub coil SC1, the second sub coil SC2, and the third sub coil SC3 may include a first group pattern area extending in the optical axis direction (Z-axis direction) and a second group pattern area extending in the first direction (X-axis direction) perpendicular to the optical axis direction (Z-axis direction) or in the vertical direction.

The first group pattern area may include a first pattern area and a third pattern area spaced apart according to positions. In addition, the second group pattern area may include a first pattern area and a third pattern area spaced apart according to positions.

In the embodiment, the second group pattern area may include the first-first coil area CA11 and the first-second coil area CA12 in the first sub coil SC1. In particular, the first-first coil area CA11 may correspond to the second pattern area. In addition, the first-second coil area CA12 may correspond to the fourth pattern area. Hereinafter, the second sub coil and the third sub coil may be applied in the same manner.

In addition, the driving coils (e.g., each of the first to third sub coils) may include the first pattern area, the second pattern area, the third pattern area, the fourth pattern area, and the curve pattern area.

A plurality of turns in the first pattern area may extend in the optical axis direction (Z-axis direction), and a plurality of turns in the second pattern area may extend in the first direction (X-axis direction) perpendicular to the optical axis direction (Z-axis direction).

The third pattern area may face the first pattern area. The third pattern area may be symmetrically disposed with respect to the first pattern area and the optical axis direction (Z-axis direction). Alternatively, the third pattern area may be positioned to overlap and be spaced apart from the first pattern area in the first direction (X-axis direction).

In addition, the fourth pattern area may face the second pattern area. The fourth pattern area and the second pattern area may be disposed to be spaced apart from each other and overlap each other in the optical axis direction (Z-axis direction). In addition, the fourth pattern area and the second pattern area may be symmetrically disposed with respect to the first direction (X-axis direction).

In addition, the curve pattern area may be disposed between the first group pattern area and the second group pattern area.

In addition, the curve pattern area may include a first curve pattern area, a second curve pattern area, a third curve pattern area, and a fourth curve pattern area.

The first curve pattern area, the second curve pattern area, the third curve pattern area, and the fourth curve pattern area may be sequentially disposed clockwise in the drawings. Likewise, the first pattern area to the fourth pattern area may be sequentially disposed clockwise. As described above, each area of the driving coil and the sub coil may be used interchangeably with the above-described terms.

Furthermore, the driving coils (e.g., the first sub coil to the third sub coil) may include the first pattern area and the second pattern area disposed in a direction perpendicular to the first pattern area. In addition, a width of the first pattern area may differ from a width of the second pattern area. For example, the width of the first pattern area may be smaller than the width of the second pattern area. Therefore, since the electromagnetic force generated by the driving coil may be increased by the width of the second pattern area, the camera actuator may provide a longer stroke.

FIG. 18 is a top view of a second driving unit and a first board according to the embodiment, FIGS. 19 and 20 are side views of the second driving unit according to the embodiment, FIG. 21 is a view for describing the movement of a second driving magnet by the second driving unit according to the embodiment, FIG. 22 is a graph showing an electromagnetic force according to a position of the second driving magnet, and FIG. 23 is a graph showing an output of a Hall sensor according to a moving distance.

Referring to FIGS. 18 to 21, as described above, the second driving magnet 1252a, the second driving coil 1251a, and the first board 1271 according to the embodiment may be sequentially disposed in the second direction (Y-axis direction).

The second driving magnet 1252a may be coupled to a yoke YK disposed at a side of (inside) the first lens assembly or the second lens assembly. In addition, the yoke YK may be coupled to a side surface of the first lens assembly or the second lens assembly through a bonding member. The bonding member may be made of various materials having a bonding strength and may be, for example, an epoxy. In addition, the yoke YK can prevent a magnetic flux generated from the coupled second driving magnet 1252a from leaking. Therefore, the yoke YK may be positioned on a surface of the second driving magnet 1252a, which does not face the second driving coil 1251, (or a surface opposite to the surface facing the second driving coil 1251). Alternatively, the yoke YK may be positioned on the entire surface of the second driving magnet 1252a excluding the surface facing the second driving coil 1251. For example, the yoke YK may be in contact with or positioned on the surface (the side surface and the surface opposite to the facing surface) of the second driving magnet 1252a excluding the surface facing the second driving coil 1251.

The second driving magnet 1252a may be divided into a plurality of areas in the third direction (Z-axis direction). In the embodiment, the second driving magnet 1252a may include a first magnet area MA1, a neutral area NA, and a second magnet area MA2 disposed in the third direction (Z-axis direction).

The first magnet area MA1 and the second magnet area MA2 may be disposed to be spaced apart from each other in the optical axis direction (Z-axis direction). In addition, the neutral area NA may be disposed between the first magnet area MA1 and the second magnet area MA2. In addition, the neutral area NA may be called various expressions such as "neutral area," "neutral part," "neutral part," "separation part," and "separation area."

In addition, the first magnet area MA1 may have a first polarity. In addition, the second magnet area MA2 may have a second polarity. In this case, the first polarity and the second polarity may be opposite polarities. For example, the first polarity may be any one of the N pole and the S pole, and the second polarity may be the other one of the N pole and the S pole. In this case, the polarity is a polarity of a surface facing an adjacent coil. For example, the first magnet area MA1 and the second magnet area MA2 of the fourth magnet may respectively have the first polarity and the second polarity on surfaces facing the fourth coil.

Furthermore, the first magnet area MA1 and the second magnet area MA2 of the second driving magnet may have various polarity structures according to magnetization methods. The first magnet area MA1 may have any one of the N pole and the S pole on a surface facing the adjacent second driving coil and have the other one of the N pole and S pole on a surface facing the first lens assembly or the second lens assembly. Likewise, the second magnet area MA2 may have any one of the N pole and the S pole on a surface facing the adjacent second driving coil and have the other one of the N pole and S pole on a surface facing the first lens assembly or the second lens assembly. For example, the S pole may be formed at an inner side of the first magnet area MA1, and the N pole may be formed at an outer side thereof. In addition, the N pole may be formed at an inner side of the second magnet area MA2, and an S pole may be formed at an outer side thereof. With this configuration, as described above, a force (e.g., an electromagnetic force, F) may be applied to the second driving coil 1251a in a direction opposite to the optical axis direction. However, since the second driving coil 1251a is a fixed component, a force F' may be applied to the second driving magnet 1252a in the optical axis direction (Z-axis direction). Therefore, the second driving magnet 1252a and the first lens assembly or the second lens assembly coupled to the second driving magnet 1252a may move in the optical axis direction (Z-axis direction). Hereinafter, "F" means a direction of the electromagnetic force applied to the second driving coil. In addition, "F'" means a direction in which the second driving magnet is moved by the electromagnetic force. However, this is an example, and as described above, the electromagnetic force may vary depending on the direction of the current or the direction of the magnetic force.

In addition, in the case of the bipolar magnetization, a length of the neutral area NA in the optical axis direction may be in a range of 5% to 40% of the entire length of the second driving magnet 1252a in the optical axis direction.

Furthermore, in the case of the unipolar magnetization, in the second magnet formed of two magnets spaced apart in the optical axis direction, a distance between the two magnets may be maintained through various assembling or coupling structures. Likewise, the distance between the two magnets may be in a range of 5% to 40% of the entire length of the second driving magnet in the optical axis direction.

Therefore, the length of the neutral area NA in the optical axis direction may be the same as or different from lengths Lb and Lc of the first magnet area MA1 or the second magnet area MA2 in the optical axis direction.

The length Lb of the first magnet area MA1 in the optical axis direction may be the same as the length Lc of the second magnet area MA2 in the optical axis direction.

In addition, in the embodiment, even when the second driving magnet 1252*a* moves in the optical axis direction (Z-axis direction), at least a portion of the second driving magnet 1252*a* may overlap the second driving coil 1251*a* in the second direction (Y-axis direction). With this configuration, the second driving magnet 1252*a* may move in the optical axis direction (Z-axis direction). In addition, when the second driving magnet 1252*a* moves, interaction between the second driving magnet 1252*a* and the second driving coil 1251*a* may be easily formed.

In addition, the length L3 of the third sub coil SC3 in the optical axis direction (Z-axis direction) may be smaller than a length La of the driving magnet 1252*a* in the optical axis direction (Z-axis direction). In addition, the length L1 or L2 of any one of the first sub coil SC1 and the second sub coil SC2 in the optical axis direction (Z-axis direction) may be smaller than the length La of the driving magnet 1252*a* in the optical axis direction (Z-axis direction).

In the embodiment, a sum of the length L1 or L2 of any one of the first sub coil SC1 and the second sub coil SC2 in the optical axis direction (Z-axis direction) and the length L3 of the third sub coil SC3 in the optical axis direction (Z-axis direction) may differ from the length La of the driving magnet 1252*a* in the optical axis direction (Z-axis direction). For example, the sum of the length L1 or L2 of any one of the first sub coil SC1 and the second sub coil SC2 in the optical axis direction (Z-axis direction) and the length L3 of the third sub coil SC3 in the optical axis direction (Z-axis direction) may be larger than the length La of the driving magnet 1252*a* in the optical axis direction (Z-axis direction). With this configuration, when the second driving magnet moves in the optical axis direction, it is possible to minimize a counter electromotive force generated by the second driving coil (in particular, the first sub coil and the second sub coil). Therefore, the camera actuator according to the embodiment can increase the moving distance of the lens assembly and provide improved driving efficiency.

Furthermore, the length L4 between the innermost turns MIT among the plurality of turns (or unit patterns, patterns, windings, lines, or the like) in the optical axis direction (Z-axis direction) in the first sub coil SC1 may be smaller than the length Lb of the first magnet area MA1 in the optical axis direction. In addition, the length L5 between the innermost turns MIT among the plurality of turns (or unit patterns) in the optical axis direction (Z-axis direction) in the second sub coil SC2 may be smaller than the length Lb of the first magnet area MA1 in the optical axis direction.

In addition, the length L4 between the innermost turns MIT among the plurality of turns (or unit patterns) in the optical axis direction (Z-axis direction) in the first sub coil SC1 may be smaller than the length Lb of the first magnet area MA1 in the optical axis direction. In addition, the length L5 between the innermost turns MIT among the plurality of turns (or unit patterns) in the optical axis direction (Z-axis direction) in the second sub coil SC2 may be smaller than the length Lc of the second magnet area MA2 in the optical axis direction.

In the embodiment, the length Lb of the first magnet area MA1 in the optical axis direction may be smaller than the length L6 between the innermost turns MIT among the plurality of turns (or unit patterns) in the optical axis direction (Z-axis direction) in the third sub coil SC3. In addition, the length Lc of the second magnet area MA2 in the optical axis direction may be smaller than the length L6 between the innermost turns MIT among the plurality of turns (or unit patterns) in the optical axis direction (Z-axis direction) in the third sub coil SC3.

In addition, the directions of the currents flowing in the first sub coil SC1 and the second sub coil SC2 may be opposite to that of the third sub coil SC3. For example, when the current flows in the first sub coil SC1 and the second sub coil SC2 counterclockwise, the current may flow in the third sub coil SC3 clockwise. Therefore, since a counter electromotive force is not generated by the current flowing in each sub coil, the lens assembly may easily move in the optical axis direction. In addition, as an additional example, when the current flows in the first sub coil SC1 and the second sub coil SC2 clockwise, the current may flow in the third sub coil SC3 counterclockwise.

Furthermore, the first sub coil SC1, the second sub coil SC2, and the third sub coil SC3 according to the embodiment may be driven with one channel. In other words, the first sub coil SC1, the second sub coil SC2, and the third sub coil SC3 may be connected in series. In this case, as described above, positions of the connected terminals may be variously set in consideration of the current directions.

Further referring to FIG. 22, a comparative example is a case in which the second driving coil has only the third sub coil, an embodiment is a case in which the second driving coil includes the first sub coil, the second sub coil, and the third sub coil, and another embodiment is a case of a second driving coil according to still another embodiment or yet another embodiment, which will be described below. Therefore, when compared to the comparative example, the camera actuator according to the embodiment may provide a maximum electromagnetic force because it additionally has two sub coils having a small length in the optical axis direction. Therefore, the camera actuator according to the embodiment may provide a larger moving distance or stroke than the comparative example. In addition, the camera actuator according to another embodiment or still another embodiment may provide a uniform electromagnetic force at various positions compared to the comparative example/the embodiment.

In addition, in an embodiment, the second camera actuator may further include a second Hall sensor unit positioned within the innermost turn among the plurality of turns (unit patterns) of the second driving coil.

As described above, the second Hall sensor unit may include the fourth Hall sensor 1253*a*. The second Hall sensor unit may overlap the second driving coil 1251*a* in the first direction (X-axis direction). In addition, the second Hall sensor unit may overlap the second driving coil 1251*a* in the third direction (Z-axis direction). In addition, the second Hall sensor unit may overlap the second driving magnet 1252*a* in the second direction (Y-axis direction).

In addition, a plurality of fourth Hall sensors 1253*a* may be formed. For example, the fourth Hall sensor 1253*a* may include a fourth-first Hall sensor 1253*aa*, a fourth-second Hall sensor 1253*ab*, and a 4-3 Hall sensor 1253*bb*. The fourth-second Hall sensor 1253*ab*, the fourth-first Hall sensor 1253*aa*, and the 4-3 Hall sensor 1253*bb* may be sequentially disposed in the third direction (Z-axis direction). For example, the fourth-first Hall sensor 1253*aa* may be disposed between the fourth-second Hall sensor 1253*ab* and the 4-3 Hall sensor 1253*bb*. With this configuration, as described above, even when the moving distance or stroke of the first lens assembly or the second lens assembly increases, a long moving distance or stroke section may be easily covered through the plurality of fourth Hall sensors 1253*a*. In other words, accurate position detection may be performed even with the increased moving distance.

In addition, based on a case in which the second driving magnet is positioned at the center, the fourth-first Hall sensor 1253*aa* may overlap the neutral area NA in the second direction (Y-axis direction). In addition, the fourth-second Hall sensor 1253*ab* may overlap the first magnet area MA1 in the second direction (Y-axis direction). In addition, the 4-3 Hall sensor 1253*bb* may overlap the second magnet area MA2 in the second direction (Y-axis direction).

Further referring to FIG. 23, the fourth-first Hall sensor 1253*aa* corresponds to "hall2." The fourth-second Hall sensor 1253*ab* corresponds to "hall1." The 4-3 Hall sensor 1253*bb* corresponds to "hall3." As described above, since the fourth-second Hall sensor 1253*ab*, the fourth-first Hall sensor 1253*aa*, and the 4-3 Hall sensor 1253*bb* are sequentially disposed in the third direction (Z-axis direction), outputs of the entire Hall sensor including the fourth-second Hall sensor 1253*ab*, the fourth-first Hall sensor 1253*aa*, and the 4-3 Hall sensor 1253*bb* may be formed linearly or close to linear according to the moving distance. In addition, the camera actuator or camera device according to the embodiment performs position detection by summing the outputs of the fourth-second Hall sensor 1253*ab*, the fourth-first Hall sensor 1253*aa*, and the 4-3 Hall sensor 1253*bb*. With this configuration, the camera actuator according to the embodiment may more accurately measure the movement or position of the first lens assembly or the second lens assembly in the optical axis direction.

In addition, in the camera actuator according to the embodiment, the second driving magnet 1252*a* may move from "CENTER" to "MAXIMUM MOVEMENT 1" or "MAXIMUM MOVEMENT 2." Here, in the case of "CENTER," the first magnet area of the second driving magnet 1252*a* may overlap the first sub coil SC1 and the third sub coil SC3 (OA). In particular, the first magnet area of the second driving magnet 1252*a* may overlap the first-first coil area CA11 of the first sub coil SC1 and the third-first coil area CA31 of the third sub coil SC3.

In the embodiment, an area in which the first magnet area overlaps the first sub coil SC1 may be smaller than an area in which the first magnet area overlaps the third sub coil SC3.

However, based on the coil providing the driving force generated by the actual electromagnetic force and extending in the first direction, the area in which the first magnet area overlaps the first sub coil may be the same as the area in which the first magnet area overlaps the third sub coil.

Therefore, it is possible to minimize the generation of the counter electromotive force, thereby implementing a long stroke.

Furthermore, a plurality of fourth Hall sensors and fifth Hall sensors may be formed. The following description will be made based on the fourth Hall sensor. The fourth Hall sensor may include the fourth-second Hall sensor, the fourth-first Hall sensor, and the 4-3 Hall sensor. In addition, the fourth-second Hall sensor the fourth-first Hall sensor, and the 4-3 Hall sensor may be sequentially disposed in the third direction (Z-axis direction). The fourth-first Hall sensor may overlap the neutral area in the second direction. The fourth-second Hall sensor may overlap the first magnet area in the second direction. In addition, the 4-3 Hall sensor may overlap the second magnet area in the second direction.

In addition, the second magnet area MA2 may overlap the second sub coil SC2 and the third sub coil SC3 (OA1). In particular, the second magnet area MA2 may overlap the second-first coil area CA21 of the second sub coil SC2 and the third-second coil area CA32 of the third sub coil SC3.

In addition, the case of "MAXIMUM MOVEMENT 1" may correspond to a case in which the second driving magnet 1252*a* maximally moves in a direction opposite to the third direction (Z-axis direction). In this case, the first magnet area MA1 of the second driving magnet 1252*a* may not overlap the first-second coil area CA12 in the second direction (Y-axis direction). Alternatively, a portion of the first magnet area MA1 of the second driving magnet 1252*a* may overlap the first-second coil area CA12. With this configuration, it is possible to reduce the generation of the counter electromotive force. For example, the second driving magnet 1252*a* may be moved with the maximum stroke up to an area that does not overlap the first-second coil area CA12 in the second direction (Y-axis direction).

In addition, the first magnet area MA1 of the second driving magnet 1252*a* may overlap the first-first coil area CA11 and the third-first coil area CA31 in the second direction (Y-axis direction) (OA1). In particular, a portion of the first magnet area MA1 may overlap the third-first coil area CA31 in the second direction (Y-axis direction). In addition, the area in which the first magnet area MA1 overlaps the third-first coil area CA31 in the second direction (Y-axis direction) may be larger than the area in which the first magnet area MA1 overlaps a portion of the first-second coil area CA12. Therefore, it is possible to suppress a reverse movement of the driving magnet caused by the counter electromagnetic force.

In addition, a predetermined separation distance dd1 may be present between the second magnet area MA2 and the third-first coil area CA31 in the optical axis direction (Z-axis direction).

In the embodiment, an area in which the first magnet area overlaps the first sub coil SC1 may be larger than the area in which the first magnet area overlaps the third sub coil SC3.

In addition, the second magnet area may overlap the third sub coil.

In addition, based on the coil providing the driving force generated by the actual electromagnetic force and extending in the first direction, an area in which the first magnet area overlaps the first-first coil area may be larger than an area in which the first magnet area overlaps the first-second coil area. In addition, at least a portion of the third-first coil area may overlap the first magnet area in the second direction.

In addition, the area in which the first magnet area overlaps the first sub coil may be the same as the area in which the first magnet area overlaps the third sub coil (based on the coil extending in the first direction). Furthermore, half or more of the third sub coil may overlap the first magnet area in the second direction. Therefore, it is possible to minimize the generation of the counter electromotive force, thereby implementing a long stroke.

In addition, the fourth-second Hall sensor, the fourth-first Hall sensor, and the 4-3 Hall sensor may overlap the second magnet area in the second direction.

In addition, the case of "MAXIMUM MOVEMENT 2" may correspond to a case in which the second driving magnet 1252*a* maximally moves in the third direction (Z-axis direction). In addition, the second magnet area MA2 may overlap the third-second coil area CA32 and the second-first coil area CA21 in the second direction (Y-axis direction) (OA2). In particular, the second magnet area MA2 may overlap a portion of the third-second coil area CA32 in the second direction (Y-axis direction). In addition, the area in which the second magnet area MA2 overlaps the third-second coil area CA32 in the second direction (Y-axis direction) may be larger than the area in which the first magnet area MA1 overlaps a portion of the first-second coil area CA12. Therefore, it is possible to suppress a reverse movement of the driving magnet caused by the counter electromagnetic force. For example, the second driving magnet 1252a may be moved with the maximum stroke up to an area that does not overlap the second-second coil area CA22 in the second direction (Y-axis direction).

In addition, a predetermined separation distance dd2 may be present between the first magnet area MA1 and the third-second coil area CA32 in the optical axis direction (Z-axis direction).

In an embodiment, a maximum moving distance MD of the second driving magnet 1252a may be larger than the lengths Lb and Lc of the first magnet area MA1 or the second magnet area MA2 in the optical axis direction (Z-axis direction).

In the embodiment, the area in which the second magnet area overlaps the second sub coil SC2 may be larger than the area in which the second magnet area overlaps the third sub coil SC3. In addition, the first magnet area may overlap the third sub coil.

In addition, based on the coil providing the driving force generated by the actual electromagnetic force and extending in the first direction, the area in which the second magnet area overlaps the second-first coil area may be larger than the area in which the second magnet area overlaps the second-second coil area. In addition, at least a portion of the third-second coil area may overlap the second magnet area in the second direction.

In addition, the area in which the second magnet area overlaps the second sub coil may be the same as the area in which the second magnet area overlaps the third sub coil (based on the coil extending in the first direction). Furthermore, half or more of the third sub coil may overlap the second magnet area in the second direction. Therefore, it is possible to minimize the generation of the counter electromotive force, thereby implementing a long stroke.

In addition, the fourth-second Hall sensor, the fourth-first Hall sensor, and the 4-3 Hall sensor may overlap the first magnet area in the second direction.

In addition, the maximum moving distance of the second driving magnet 1252a may correspond to lengths of the first and second recesses accommodating the first ball or the second ball in the above-described first lens assembly in the optical axis direction. In addition, the maximum moving distance of the second driving magnet 1252a may correspond to a distance of the first magnet area MA1 moving from MAXIMUM MOVEMENT 1 to MAXIMUM MOVEMENT 2 in the optical axis direction (Z-axis direction). Alternatively, the maximum moving distance of the second driving magnet 1252a may correspond to a distance between stoppers for restricting the movement of the first ball or the second ball in the optical axis direction. Alternatively, the maximum moving distance of the second driving magnet 1252a may be a maximum distance that a bobbin may move and may correspond to a separation distance in the optical axis direction between a stopper positioned in the optical axis direction and a stopper positioned in a direction opposite to the optical axis direction with respect to the bobbin. In addition, the maximum moving distance of the second driving magnet 1252a may correspond to twice a distance moving from CENTER to MAXIMUM MOVEMENT 1. In addition, the moving distance of the second driving magnet 1252a according to the embodiment may be in a range of −3 to +3 mm based on CENTER. Specifically, the moving distance of the second driving magnet 1252a may be in a range of −2.8 to +2.8 mm based on CENTER. More specifically, the moving distance of the second driving magnet 1252a according to the embodiment may be in a range of −2.5 to +2.5 mm based on CENTER. Here, the moving distance from CENTER in the optical axis direction has a "+" value, and a direction opposite to the optical axis direction has a "−" value. Therefore, the second driving magnet 1252a (or at least one of the first lens assembly and the second lens assembly) according to the embodiment may move in a range of 0 to 12 mm in the optical axis direction. In addition, the above-described maximum moving distance may correspond to the maximum stroke of the lens assembly in the camera module.

In addition, in the second camera actuator according to the embodiment, any one of the first magnet area MA1 and the second magnet area MA in MAXIMUM MOVEMENT 1 or MAXIMUM MOVEMENT 2 may not overlap the third-first coil area CA31 or the third-second coil area CA32 of the third sub coil SC3 in the second direction (Y-axis direction). However, at least a portion of the other one of the first magnet area MA1 and the second magnet area MA in MAXIMUM MOVEMENT 1 or MAXIMUM MOVEMENT 2 may overlap any one of the third-first coil area CA31 and the third-second coil area CA32 of the third sub coil SC3 and a coil area adjacent to the any one area in the second direction (Y-axis direction). With this configuration, it is possible to suppress the generation of the counter electromagnetic force even when the second driving magnet 1252a moves in the optical axis direction, thereby providing the uniform driving force (electromagnetic force).

FIG. 24 is a view illustrating a second driving coil according to another embodiment, FIG. 25 is a view illustrating a second driving coil according to still another embodiment, and FIG. 26 is a cross-sectional view of a second camera actuator according to a modified example.

Referring to FIG. 24, the second driving coil 1251a according to another embodiment includes the fourth coil 1251a and the fifth coil 1251b as described above. The following description will be made based on the second driving coil including the fourth coil and the fifth coil.

Furthermore, the second driving coil 1251a or 1251b (described as "1251a" below) according to another embodiment may be formed of a plurality of coils as described above. In other words, the second driving coil 1251a may include the first sub coil SC1, the second sub coil SC2, and the third sub coil SC3.

In addition, as described above, the second driving coil 1251a may be formed of at least one winding or turn. In addition, the following description will be made based on the second driving coil 1251a formed with a plurality of turns. In addition, the second driving coil 1251a may be formed of various types. For example, the second driving coil 1251a may be formed of various coils such as a fine pitch (FP) coil. Furthermore, the present invention is not limited to these types.

In addition, the above-described contents excluding the following description may be applied to the description of the second driving coil in the same manner.

The second driving coil 1251a according to another embodiment may have a length H7 of the first-second coil area CA12 in the vertical direction or in the first direction (X-axis direction) that is larger than a length H9 of the first-first coil area CA11 in the vertical direction or in the first direction (X-axis direction).

In addition, a length H8 of the second-second coil area CA22 in the vertical direction may be larger than the length H9 of the second-first coil area CA21 in the vertical direction.

With this configuration, as described above, the first and second lens assemblies may provide the uniform electromagnetic force at various positions while moving with the increased moving distance in the optical axis direction. Therefore, it is possible to improve the movement or driving accuracy of the first and second lens assemblies.

Referring to FIG. 25, the second driving coil 1251a according to still another embodiment includes the fourth coil 1251a and the fifth coil 1251b as described above. The following description will be made based on the second driving coil including the fourth coil and the fifth coil.

Furthermore, the second driving coil 1251a or 1251b (described as "1251a" below) according to still another embodiment may be formed of a plurality of coils as described above. In other words, the second driving coil 1251a may include the first sub coil SC1, the second sub coil SC2, and the third sub coil SC3.

In addition, as described above, the second driving coil 1251a may be formed of at least one winding or turn. In addition, the following description will be made based on the second driving coil 1251a formed with a plurality of turns. In addition, the second driving coil 1251a may be formed of various types. For example, the second driving coil 1251a may be formed of various coils such as an FP coil. Furthermore, the present invention is not limited to these types.

In addition, the above-described contents excluding the following description may be applied to the description of the second driving coil in the same manner.

In the embodiment, the length W7 of each turn in the optical axis direction (Z-axis direction) in the first-second coil area CA12 may differ from a length W8 of each turn in the optical axis direction (Z-axis direction) in the first-first coil area CA11.

For example, the length W7 of each turn in the optical axis direction (Z-axis direction) in the first-second coil area CA12 may be larger than the length W8 of each turn in the optical axis direction (Z-axis direction) in the first-first coil area CA11. With this configuration, the first and second lens assemblies may provide the uniform electromagnetic force at various positions while moving with the increased moving distance in the optical axis direction. Therefore, it is possible to improve the movement or driving accuracy of the first and second lens assemblies.

In addition, a gap gap7 between adjacent patterns (or turns) in the first-second coil area CA12 may be different from or the same as a gap gap8 between adjacent patterns (or turns) in the first-first coil area CA11.

Furthermore, a length W10 of each turn in the optical axis direction (Z-axis direction) in the second-second coil area CA22 may differ from a length W9 of each turn in the optical axis direction (Z-axis direction) in the second-first coil area CA21.

For example, the length W10 of each turn in the optical axis direction (Z-axis direction) in the second-second coil area CA22 may be larger than the length W9 of each turn in the optical axis direction (Z-axis direction) in the second-first coil area CA21. With this configuration, the first and second lens assemblies may provide the uniform electromagnetic force at various positions while moving with the increased moving distance in the optical axis direction. Therefore, it is possible to improve the movement or driving accuracy of the first and second lens assemblies.

In addition, a gap gap10 between adjacent patterns (or turns) in the second-second coil area CA22 may be different from or the same as a gap gap9 between adjacent patterns (or turns) in the second-first coil area CA21.

Furthermore, in the first sub coil and the second sub coil, the first-second coil area CA12, the first-first coil area CA11, the second-first coil area CA21, and the second-second coil area CA22 may be sequentially disposed in the optical axis direction. In addition, in the driving coil, the first-second coil area CA12, the first-first coil area CA11, the third-first coil area CA31, the third-second coil area CA32, the second-first coil area CA21, and the second-second coil area CA22 may be sequentially disposed in the optical axis direction.

Referring to FIG. 26, in a second camera actuator according to a modified example, the number of coils for driving the first lens assembly may differ from the number of coils for driving the second lens assembly among the second driving coils. In the second camera actuator according to the above-described embodiment, since the number of coils for driving the first lens assembly and the number of coils for driving the second lens assembly among the second driving coils are the same as each other, the same or similar strokes may be provided to the first and second lens assemblies.

In contrast, in the modified example, since the number of coils for driving the first lens assembly and the number of coils for driving the second lens assembly differ from each other, different strokes may be provided to the first and second lens assemblies according to the length of the driving stroke.

For example, among the second driving coils, the number of coils for driving the first lens assembly may be larger than the number of driving the second lens assembly. Alternatively, among the second driving coils, the number of coils for driving the first lens assembly may be smaller than the number of coils for driving the second lens assembly.

In other words, the above-described structure of the second driving coil 1251 having the plurality of coils having different lengths in the optical axis direction may be applied to only a lens assembly that performs AF. For example, when the first lens assembly performs the AF and the second lens assembly performs zooming, the structure of the second driving coil according to the embodiment may be applied to only the fourth coil (including the plurality of coils) for providing the driving force to the first lens assembly.

In addition, in an additional modified example, a structure of the second driving coil 1251 having a plurality of coils having different lengths in the optical axis direction may be applied to only a lens assembly that performs the zooming. For example, when the first lens assembly performs the AF and the second lens assembly performs the zooming, the structure of the second driving coil according to the embodiment may be applied to only the fifth coil for providing the driving force to the second lens assembly.

In addition, the above-described structure of the second driving coil 1251 having the plurality of coils having different lengths in the optical axis direction may be applied to all of the lens assemblies that perform the AF and the zooming. For example, when the first lens assembly performs the AF and the second lens assembly performs the zooming, the structure of the second driving coil according to the embodiment may be applied to only the fourth coil and the fifth coil for providing the driving force to the first lens assembly and the second lens assembly.

Furthermore, the above-described camera device may be manufactured by assembling the first camera actuator or the second camera actuator and then coupling the first camera actuator to the second camera actuator.

FIG. 27 is a perspective view of a mobile terminal to which the camera module according to the embodiment is applied.

Referring to FIG. 27, a mobile terminal 1500 according to the embodiment may include the camera device 1000, a flash module 1530, and an AF device 1510, which are provided on a rear surface thereof.

The camera device 1000 may include an image photographing function and an AF function. For example, the camera device 1000 may include the AF function using an image.

The camera device 1000 processes an image frame of a still image or a moving image obtained by an image sensor in a photographing mode or a video call mode.

The processed image frame may be displayed on a predetermined display and stored in a memory. A camera (not illustrated) may also be disposed on a front surface of a body of the mobile terminal.

For example, the camera device 1000 may include a first camera device 1000A and a second camera device 1000B, and the first camera device 1000A may implement an OIS function together with an AF or zooming function. In addition, the second camera device 1000B may implement the AF, zooming, and OIS functions. In this case, since the first camera device 1000A includes both the above-described first camera actuator and second camera actuator, it is possible to easily miniaturize the camera device by changing an optical path.

The flash module 1530 may include a light emitting device for emitting light therein. The flash module 1530 may be operated by a camera operation of the mobile terminal or a user's control.

The AF device 1510 may include one of a package of a surface light emitting laser device as a light emitting unit.

The AF device 1510 may include the AF function using a laser. The AF device 1510 may be mainly used in a condition in which the AF function using the image of the camera device 1000 is degraded, for example, in an environment that is close to 10 m or less or dark.

The AF device 1510 may include a light emitting unit including a vertical cavity surface emitting laser (VCSEL) semiconductor device and a light receiving unit for converting light energy into electrical energy, such as a photodiode.

FIG. 28 is a perspective view of a vehicle to which the camera device according to the embodiment is applied.

For example, FIG. 28 is a view of an exterior of a vehicle including a vehicle driver assistance device to which the camera device 1000 according to the embodiment is applied.

Referring to FIG. 28, a vehicle 700 according to the embodiment may include wheels 13FL and 13FR rotated by a power source and a predetermined sensor. The sensor may be a camera sensor 2000, but the present invention is not limited thereto.

The camera sensor 2000 may be a camera sensor to which the camera device 1000 according to the embodiment is applied. The vehicle 700 according to the embodiment may acquire image information through the camera sensor 2000 for photographing a front image or a surrounding image, determine a situation in which a lane line is not identified using the image information, and generate a virtual lane line when the lane line is not identified.

For example, the camera sensor 2000 may acquire a front image by photographing a view in front of the vehicle 700, and a processor (not illustrated) may acquire image information by analyzing an object included in the front image.

For example, when a lane line, an adjacent vehicle, a traveling obstacle, and objects, such as a median, a curb, or a tree corresponding to an indirect road mark, are photographed in the image photographed by the camera sensor 2000, the processor may detect the object and include the detected object in the image information. In this case, the processor may further supplement the image information by acquiring information on a distance from the object detected through the camera sensor 2000.

The image information may be information on the object photographed in the image. The camera sensor 2000 may include an image sensor and an image processing module.

The camera sensor 2000 may process still images or moving images obtained by the image sensor (e.g., a complementary metal-oxide semiconductor (CMOS) or a charge-coupled device (CCD)).

The image processing module may process the still images or moving images acquired through the image sensor to extract necessary information, and transmit the extracted information to the processor.

In this case, the camera sensor 2000 may include a stereo camera in order to improve the measurement accuracy of the object and further secure information such as a distance between the vehicle 700 and the object, but the present invention is not limited thereto.

Although embodiments have been mainly described above, these are only illustrative and do not limit the present invention, and those skilled in the art to which the present invention pertains can know that various modifications and applications not exemplified above are possible without departing from the essential characteristics of the embodiments. For example, each component specifically illustrated in the embodiments may be implemented by modification. In addition, differences related to these modifications and applications should be construed as being included in the scope of the present invention defined in the appended claims.

The invention claimed is:

1. A camera actuator comprising:
    a housing;
    a first lens assembly and a second lens assembly configured to move in an optical axis direction based on the housing; and
    a driving unit configured to move the first lens assembly and the second lens assembly,
    wherein the driving unit includes a driving coil and a driving magnet facing the driving coil,
    wherein the driving coil includes a first sub coil, a second sub coil, and a third sub coil disposed between the first sub coil and the second sub coil,
    wherein the first sub coil, the third sub coil, and the second sub coil are sequentially disposed along an optical axis, and
    wherein a length of the third sub coil in the optical axis direction differs from a length of at least one of the first sub coil and the second sub coil in the optical axis direction.

2. The camera actuator of claim 1, wherein the length of the third sub coil in the optical axis direction is larger than the length of the at least one of the first sub coil and the second sub coil in the optical axis direction.

3. The camera actuator of claim 1, wherein the length of the first sub coil in the optical axis direction is the same as the length of the second sub coil in the optical axis direction.

4. The camera actuator of claim 1, wherein a sum of the length of the at least one of the first sub coil and the second sub coil and the length of the third sub coil in the optical axis direction is larger than a length of the driving magnet in the optical axis direction.

5. The camera actuator of claim 1, wherein the driving coil is formed with a plurality of turns.

6. The camera actuator of claim 5, wherein the first sub coil includes a first coil area having a pattern extending in a vertical direction,
wherein the second sub coil includes a second coil area having a pattern extending in the vertical direction, and
wherein the third sub coil includes a third coil area having a pattern extending in the vertical direction.

7. The camera actuator of claim 6, wherein the first coil area includes a first-first coil area adjacent to the third sub coil, and a first-second coil area spaced apart from the first-first coil area along the optical axis, and
wherein the second coil area includes a second-first coil area adjacent to the third sub coil, and a second-second coil area spaced apart from the second-first coil area along the optical axis.

8. The camera actuator of claim 7, wherein a length of the first-second coil area in the vertical direction is larger than a length of the first-first coil area in the vertical direction.

9. The camera actuator of claim 7, wherein a length of the second-second coil area in the vertical direction is larger than a length of the second-first coil area in the vertical direction.

10. The camera actuator of claim 7, wherein a length of each turn in the optical axis direction in the first-second coil area differs from a length of each turn in the optical axis direction in the first-first coil area.

11. The camera actuator of claim 7, wherein a length of the first-second coil area in the optical axis direction differs from a length of the first-first coil area in the optical axis direction.

12. The camera actuator of claim 7, wherein the third coil area includes a third-first coil area adjacent to the first sub coil, and a third-second coil area spaced apart from the second-first coil area along the optical axis.

13. The camera actuator of claim 12, wherein a length between an innermost turn among a plurality of turns in the third-first coil area and an innermost turn among a plurality of turns in the third-second coil area in the optical axis direction is larger than the length of the first sub coil or the second sub coil in the optical axis direction.

14. The camera actuator of claim 1, wherein a surface of the driving magnet facing the driving coil includes a first magnet area having a first polarity and a second magnet area having a second polarity.

15. The camera actuator of claim 14,
wherein the first polarity is opposite to the second polarity.

16. The camera actuator of claim 14, wherein the first magnet area overlaps the first sub coil and the third sub coil.

17. The camera actuator of claim 14,
wherein the second magnet area overlaps the second sub coil and the third sub coil.

18. The camera actuator of claim 14,
wherein a N pole is formed at an inner side of the second magnet area, and an S pole is formed at an outer side of the second magnet area.

19. The camera actuator of claim 14, wherein the surface of the driving magnet facing the driving coil includes the neutral area is disposed between the first magnet area and the second magnet area.

20. The camera actuator of claim 14, wherein the length of the first magnet area in the optical axis direction is the same as the length of the second magnet area.

* * * * *